United States Patent
Bergstrom et al.

(10) Patent No.: US 9,589,051 B2
(45) Date of Patent: Mar. 7, 2017

(54) SYSTEMS AND METHODS FOR DATA ANALYSIS

(71) Applicant: University of Washington through Its Center for Commercialization, Seattle, WA (US)

(72) Inventors: Carl Bergstrom, Seattle, WA (US); Martin Rosvall, Umeå (SE); Daril Vilhena, Seattle, WA (US); Jevin D. West, Kenmore, WA (US); Andrew Torrance, Leawood, KS (US)

(73) Assignee: University of Washington Through its Center for Commercialization, Seattle, WA (US)

( * ) Notice: Subject to any disclaimer, the term of this patent is extended or adjusted under 35 U.S.C. 154(b) by 284 days.

(21) Appl. No.: 14/371,364

(22) PCT Filed: Feb. 1, 2013

(86) PCT No.: PCT/US2013/024517
§ 371 (c)(1),
(2) Date: Jul. 9, 2014

(87) PCT Pub. No.: WO2013/116788
PCT Pub. Date: Aug. 8, 2013

(65) Prior Publication Data
US 2014/0337280 A1  Nov. 13, 2014

Related U.S. Application Data

(60) Provisional application No. 61/593,761, filed on Feb. 1, 2012, provisional application No. 61/593,749, filed
(Continued)

(51) Int. Cl.
*G06F 17/30* (2006.01)

(52) U.S. Cl.
CPC .............. *G06F 17/30728* (2013.01)

(58) Field of Classification Search
CPC .................................. G06F 17/30728
See application file for complete search history.

(56) References Cited

U.S. PATENT DOCUMENTS

| | | | | |
|---|---|---|---|---|
| 2003/0004942 A1* | 1/2003 | Bird | .................. | G06F 17/30616 |
| 2006/0026152 A1* | 2/2006 | Zeng | .................. | G06F 17/30864 |

(Continued)

FOREIGN PATENT DOCUMENTS

WO    02/091155 A2    11/2002

OTHER PUBLICATIONS

Huang, M., and Q. Nguyen. "Visualization of Large Citation Networks with Space-Efficient Multi-Layer Optimization." International Conference on Information Technology and Applications. Macquarie Scientific Publishing, 2007.*

(Continued)

*Primary Examiner* — William Spieler
(74) *Attorney, Agent, or Firm* — McDonnell Boehnen Hulbert & Berghoff LLP

(57) ABSTRACT

Described herein are methods and systems for hierarchically mapping, ranking, and labeling data sets automatically. Also provided are methods for browsing and navigating a hierarchically mapped data set, and START identifying changes in network structure over time. An example method may involve receiving document data indicating a corpus of documents and references between documents within the corpus. Based on the document data, a network comprising two or more nodes and at least one directed edge may be determined. Also, a hierarchical partition of the documents may be determined based on the directed edges of the network. The hierarchical partition may define a plurality of nested modules, and each module in the plurality of nested
(Continued)

modules may be associated with one or more respective documents within the corpus. The method may additionally include causing a graphical display to provide a visual indication of one or more of the plurality of nested modules.

32 Claims, 17 Drawing Sheets

Related U.S. Application Data on Feb. 1, 2012, provisional application No. 61/723,309, filed on Nov. 6, 2012, provisional application No. 61/722,995, filed on Nov. 6, 2012.

(56) References Cited

U.S. PATENT DOCUMENTS

| | | | | |
|---|---|---|---|---|
| 2006/0101102 | A1* | 5/2006 | Su | G06F 17/30713 |
| 2006/0248053 | A1* | 11/2006 | Sanfilippo | G06F 17/3071 |
| 2006/0271536 | A1* | 11/2006 | Zhang | G06F 17/30728 |
| 2007/0239706 | A1* | 10/2007 | Zhang | G06F 17/30728 |
| 2007/0255686 | A1* | 11/2007 | Kemp | G06F 17/30867 |
| 2008/0313247 | A1* | 12/2008 | Galvin | G06F 17/30864 |
| | | | | 708/200 |
| 2009/0254543 | A1* | 10/2009 | Ber | G06F 17/30675 |
| 2010/0082709 | A1* | 4/2010 | Yamamoto | G06F 17/30011 |
| | | | | 707/812 |
| 2010/0268708 | A1 | 10/2010 | Zhang et al. | |
| 2011/0161089 | A1 | 6/2011 | Kuan et al. | |

OTHER PUBLICATIONS

URLAppraisal.net, About URL Appraisal, Jul. 14, 2008, accessed Jul. 13, 2016 at http://web.archive.org/web/20080714125435/http://www.urlappraisal.net/article/aboutus.html.*

Aljaber, Bader, et al. "Document clustering of scientific texts using citation contexts." Information Retrieval 13.2 (2010): 101-131.*

Rosvall, Martin, Daniel Axelsson, and Carl T. Bergstrom. "The map equation." The European Physical Journal Special Topics 178.1 (2009): 13-23.*

Leydesdorff, Loet. "Clusters and maps of science journals based on bi-connected graphs in Journal Citation Reports." Journal of Documentation 60.4 (2004): 371-427.*

Dhillon, Inderjit S., Yuqiang Guan, and Brian Kulis. "Weighted graph cuts without eigenvectors a multilevel approach." IEEE transactions on pattern analysis and machine intelligence 29.11 (2007): 1944-1957.*

Sobek, PageRank Implementation, Jun. 10, 2002, accessed Jul. 13, 2016 at http://web.archive.org/web/20020610005909/http://pr.efactory.de/e-pagerank-implementation.shtml.*

Bolelli, Levent, Seyda Ertekin, and C. Lee Giles. "Clustering scientific literature using sparse citation graph analysis." European Conference on Principles of Data Mining and Knowledge Discovery. Springer Berlin Heidelberg, 2006.*

Rosvall, Martin, and Carl T. Bergstrom. "Mapping change in large networks." PloS one 5.1 (2010): e8694.*

Rosvall, Martin, and Carl T. Bergstrom. "Multilevel compression of random walks on networks reveals hierarchical organization in large integrated systems." PloS one 6.4 (2011): e18209.*

Rosvall, Martin, and Carl T. Bergstrom. "Maps of random walks on complex networks reveal community structure." Proceedings of the National Academy of Sciences 105.4 (2008): 1118-1123.*

Althouse, et al., "Differences in Impact Factor Across Fields and Over Time," Journal of the American Society for Information Science and Technology, vol. 60, No. pp. 27-34, 2009.

Lancichinetti, et al., "Community Detection Algorithms: A Comparative Analysis," Physical Review E, vol. 80, pp. 056117-1-056117-11, 2009.

PCT/US2013/024517 Notification of Transmittal of the International Search Report and the Written Opinion of the International Searching Authority, or the Declaration, mailed Jun. 3, 2013.

West Conference on Applications of Network Theory, 2 pages, Apr. 8, 2011.

* cited by examiner

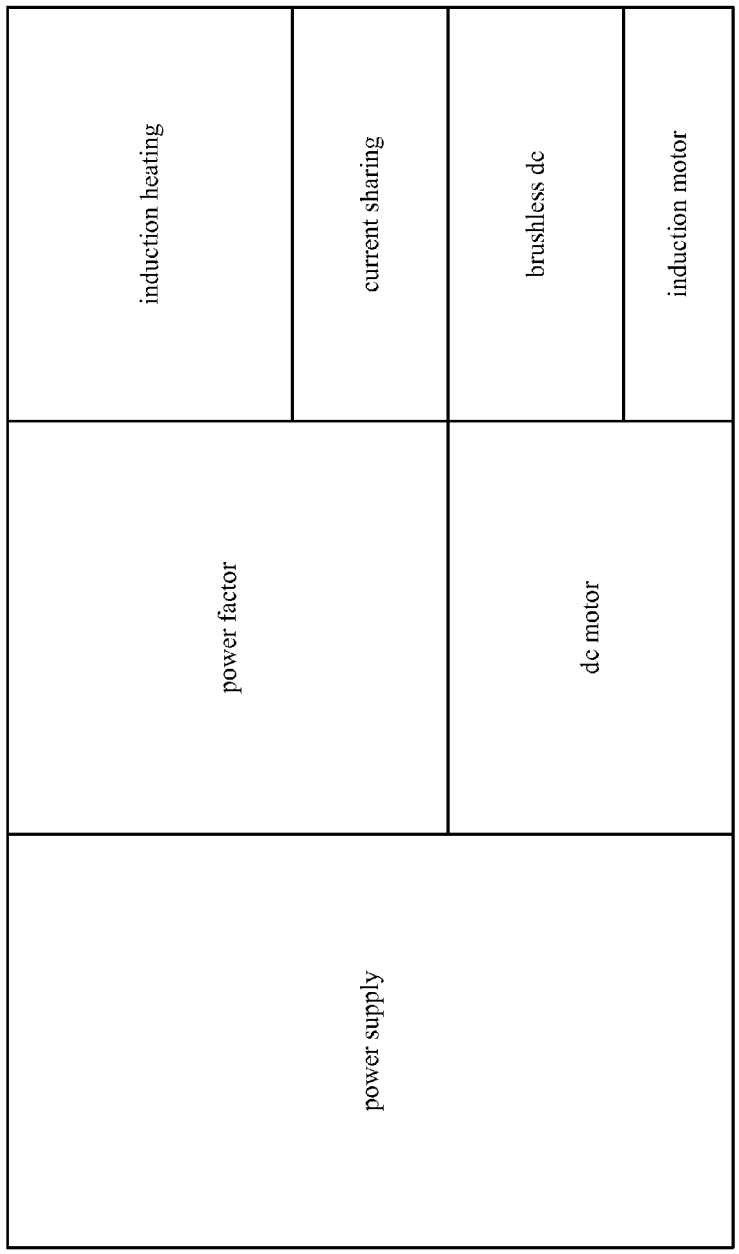

Patent Reveal

Search results

ID: x,xxx,xxx
Title: Method for virtual reality...
Inventor: John Smith
Year: 1994
Category: virtual reality
Listed Category: surgery
Rank value: 1.55543

ID: x,xxx,xxx
Title: Virtual reality system...
Inventor: John Doe
Year: 1993
Category: virtual reality
Listed Category: virtual reality
Rank value: 1.54001

Patent Reveal

Search results

ID: x,123,xxx

Title: System and method for...

Inventor: Bob Smith

Year: 1998

Category: automotive

Listed Category: automotive

Rank value: 1.3052

FIG. 8A

Patent Reveal

Search results

ID: x,123,xxx

Title: System and method for...

Inventor: Bob Smith

Year: 1998

Category: automotive

Listed Category: automotive

Rank value: 1.3052

---

ID: x,xxx,xxx

Title: Apparatus for...

Year: 1996

Category: automotive

Listed Category: automotive

Rank value: 2.4561

---

ID: x,xxx,xxx

Title: Method of ...

Year: 1996

Category: automotive

Listed Category: automotive

Rank value: 2.0561

------------------------------------------------
Patent Reveal
------------------------------------------------

Total rank value: 4.5664

ID: x,234,xxx

Title: System and method for...

Rank value: 1.3052

ID: x,345,xxx

Title: ...

Rank value: 2.0456

ID: x,456,xxx

Title: ...

Rank value: 1.2156

FIG. 9

SYSTEMS AND METHODS FOR DATA ANALYSIS

RELATED APPLICATIONS

This application is a U.S. National Phase of International Application No. PCT/US2013/024517, filed Feb. 1, 2013, which claims priority to U.S. Provisional Application No. 61/593,761, filed Feb. 1, 2012; and U.S. Provisional Application No. 61/593,749, filed Feb. 1, 2012 and U.S. Provisional Application No. 61/723,309, filed Nov. 6, 2012, and U.S. Provisional Application No. 61/722,955, filed Nov. 6, 2012, the disclosures of which are hereby incorporated by reference in their entireties.

STATEMENT OF U.S. GOVERNMENT INTEREST

This invention was made with Government Support under grant U54 GM088588, awarded by the National Institutes of Health, and grant SBE 0915005, awarded by the National Science Foundation. The government has certain rights in the invention.

FIELD OF THE INVENTION

The disclosure herein relates generally to automatically classifying data sets, and in particular, to methods and systems for hierarchically classifying, ranking, labeling, and navigating data sets.

BACKGROUND

Unless otherwise indicated herein, the materials described in this section are not prior art to the claims in this application and are not admitted to be prior art by inclusion in this section.

Organizing and classifying complex relational data can provide useful information for comprehending the structure of large integrated systems. For example, community-detection algorithms may be used to identify the presence of multiple sub-structures within a larger network and to categorize respective nodes of a network into one of the multiple sub-structures. Herein, such sub-structures within a network may be referred to as modules. Accordingly, a module may generally be understood to include a group of nodes in a network. For example, many networks include groups of nodes that are more densely connected internally than with the rest of a network.

While categorizing nodes into modules may be a good starting point, many complex networks contain relationships that are deeper than two levels. For instance, biological and social systems are often characterized by a hierarchical organization having multiple levels of submodules that are nested within modules. Network theory offers tools for identifying nested modules within a network of interconnected nodes, but current techniques for automatically ranking and mapping network structures tend to be inefficient, incomplete, inaccurate, time-consuming, and dependent on direct human-mediation.

Improvements are therefore desired.

SUMMARY

Described herein are methods and systems for hierarchically mapping, ranking, and labeling data sets automatically. Also provided are methods for browsing and navigating a hierarchically mapped data set, and identifying changes in network structure over time.

In one example aspect, a computer-implemented method is provided. The method may involve receiving document data indicating (i) a corpus of documents and (ii) references between documents within the corpus of documents. The method may further include determining a network including (i) two or more nodes and (ii) at least one directed edge. Each node may correspond to a respective document in the corpus of documents and each directed edge may connect two respective nodes and correspond to a reference between two documents in the corpus of documents. Also, the method may include determining a hierarchical partition of the documents based on the directed edges of the network. The hierarchical partition may define a plurality of nested modules, and each module in the plurality of nested modules may be associated with one or more respective documents within the corpus of documents. The method may additionally include causing a graphical display to provide a visual indication of one or more of the plurality of nested modules.

In another example aspect, a system including at least one processor, a physical computer readable medium, and program instructions stored on the physical computer readable medium is provided. The instructions may be executable by the at least one processor to receive document data indicating (i) a corpus of documents and (ii) references between documents within the corpus of documents. The instructions may be further executable to determine a network including (i) two or more nodes and (ii) at least one directed edge. Each node may correspond to a respective document in the corpus of documents, and each directed edge may connect two respective nodes and correspond to a reference between two documents in the corpus of documents. Additionally, the instructions may be executable to determine a hierarchical partition of the documents based on the directed edges of the network. The hierarchical partition may define a plurality of nested modules, and each module in the plurality of nested modules may be associated with one or more respective documents within the corpus of documents.

In another example aspect, a physical computer readable medium having instructions stored thereon is provided. The instructions may include receiving document data indicating (i) a corpus of documents and (ii) references between documents within the corpus of documents. The instructions may further include determining a network including (i) two or more nodes and (ii) at least one directed edge. Each node may correspond to a respective document in the corpus of documents and each directed edge may connect two respective nodes and correspond to a reference between two documents in the corpus of documents. Also, the instructions may include determining a hierarchical partition of the documents based on the directed edges of the network. The hierarchical partition may define a plurality of nested modules, and each module in the plurality of nested modules may be associated with one or more respective documents within the corpus of documents. The instructions may additionally include causing a graphical display to provide a visual indication of one or more of the plurality of nested modules.

In a further aspect, a computer-implemented method is provided. The method may involve receiving partition data indicating a first hierarchical partition of a first corpus of documents associated with a first time period and receiving partition data indicating a second hierarchical partition of a second corpus of documents associated with a second time period. The first hierarchical partition may define a first plurality of nested modules, and each module in the first plurality of nested modules may be associated with one or more respective documents within the first corpus of documents. Similarly, the second hierarchical partition may define a second plurality of nested modules, and each module in the second plurality of nested modules may be associated with one or more respective documents within the second corpus of documents. The method may also include comparing (i) a difference between (a) a number of references to documents within a particular module of the first plurality of nested modules and (b) a number of references to documents within a corresponding module of the second plurality of nested modules to (ii) a threshold. Additionally, the method may include causing a graphical display to provide a visual indication of the difference and the particular module based on the comparison.

In a further aspect a system including at least one processor, a physical computer readable medium, and program instructions stored on the physical computer readable medium is provided. The instructions may be executable by the at least one processor to receive partition data indicating a first hierarchical partition of a first corpus of documents associated with a first time period, and receive partition data indicating a second hierarchical partition of a second corpus of documents associated with a second time period. The first hierarchical partition may define a first plurality of nested modules, and each module in the first plurality of nested modules may be associated with one or more respective documents within the first corpus of documents. Similarly, the second hierarchical partition may define a second plurality of nested modules, and each module in the second plurality of nested modules may be associated with one or more respective documents within the second corpus of documents. The instructions may also be executable to compare (i) a difference between (a) a number of references to documents within a particular module of the first plurality of nested modules and (b) a number of references to documents within a corresponding module of the second plurality of nested modules to (ii) a threshold. Additionally, the instructions may be executable to cause a graphical display to provide a visual indication of the difference and the particular module based on the comparison.

In another example aspect, a physical computer readable medium having instructions stored thereon is provided. The instructions may include receiving partition data indicating a first hierarchical partition of a first corpus of documents associated with a first time period, and receiving partition data indicating a second hierarchical partition of a second corpus of documents associated with a second time period. The first hierarchical partition may define a first plurality of nested modules, and each module in the first plurality of nested modules may be associated with one or more respective documents within the first corpus of documents. Similarly, the second hierarchical partition may define a second plurality of nested modules, and each module in the second plurality of nested modules may be associated with one or more respective documents within the second corpus of documents. The instructions may also include comparing (i) a difference between (a) a number of references to documents within a particular module of the first plurality of nested modules and (b) a number of references to documents within a corresponding module of the second plurality of nested modules to (ii) a threshold. Additionally, the instructions may include causing a graphical display to provide a visual indication of the difference and the particular module based on the comparison.

Aspects of the embodiments disclosed herein can be combined with other embodiments or combinations of embodiments unless the context clearly dictates otherwise.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIGS. 5A and 5B are conceptual illustrations of a multi-scale map.

FIGS. 7-9 show example search results.

DETAILED DESCRIPTION

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that aspects of the present disclosure, as generally described herein, and illustrated in the figures, can be arranged, substituted, combined, separated, and/or designed in a wide variety of different configurations, all of which are explicitly contemplated herein.

Further, for purposes of illustration, certain aspects of the disclosure herein will be described with respect to particular types of documents, such as patent documents and scholarly publications. It should be understood, however, that part or all of the described systems and methods may apply equally to other types of documents. Therefore, the described embodiments should not be taken to be limiting.

I. First Example Method

Described herein are methods and systems for hierarchically classifying data sets. The methods and systems may facilitate hierarchically classifying, ranking, and labeling data sets. Also described are methods for navigating hierarchically classified data sets, and identifying changes in a network structure of a data set (e.g., as new data is added to the data set over time, as existing data is removed from the data set over time).

In some examples, the methods and systems described herein may be used to automatically classify a corpus of documents that can be characterized as a time-directed network. In a time-directed network of documents, documents generally reference or cite temporal predecessors (e.g., each respective document may only reference documents that were published prior to the document). Examples of groups of documents that form time-directed networks include scholarly documents, patent documents, or litigation documents, whether published or not published, among other documents. Other aspects, uses, and advantages of the methods and systems described herein are described further below.

Additionally, although examples herein are described with respect to classifying a corpus of documents, the methods and systems may also be applicable to classifying other types of data sets. For example, the systems and methods may similarly be used to hierarchically classify a data set that includes information identifying a plurality of social media users and communications between the social media users. Other examples may exist.

Figure 1:
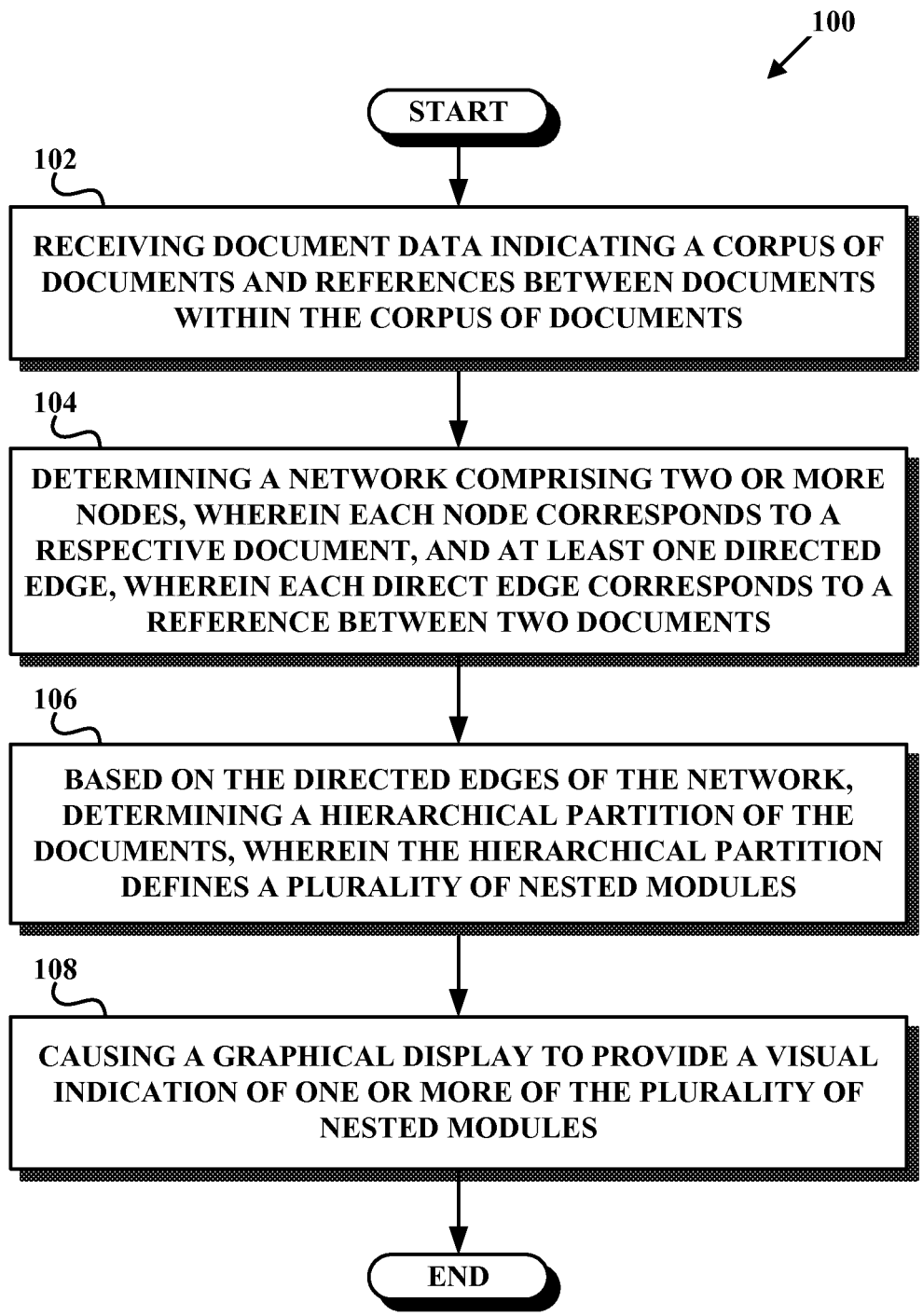
FIG. 1 is a flow chart of an example method for determining a hierarchical partition of a corpus of documents.

With reference to FIG. 1, an example method 100 for determining a hierarchical partition of a corpus of documents is described. As shown in FIG. 1, initially at block 102, the method 100 includes receiving document data indicating a corpus of documents and references between documents within the corpus of documents. At block 104, the method 100 includes determining a network including two or more nodes and at least one directed edge. Each node may correspond to a respective document in the corpus of documents and each directed edge may correspond to a reference between documents within the corpus of documents. At block 106, the method 100 includes determining a hierarchical partition of the documents based on the directed edges of the network. The hierarchical partition may define a plurality of nested modules, and each module in the plurality of nested modules may be associated with one or more respective documents within the corpus of documents. At block 108, the method 100 includes causing a graphical display to provide a visual indication of one or more of the plurality of nested modules. These steps are more fully explained in the following subsections, with reference to FIGS. 2-4.

Figure 14:
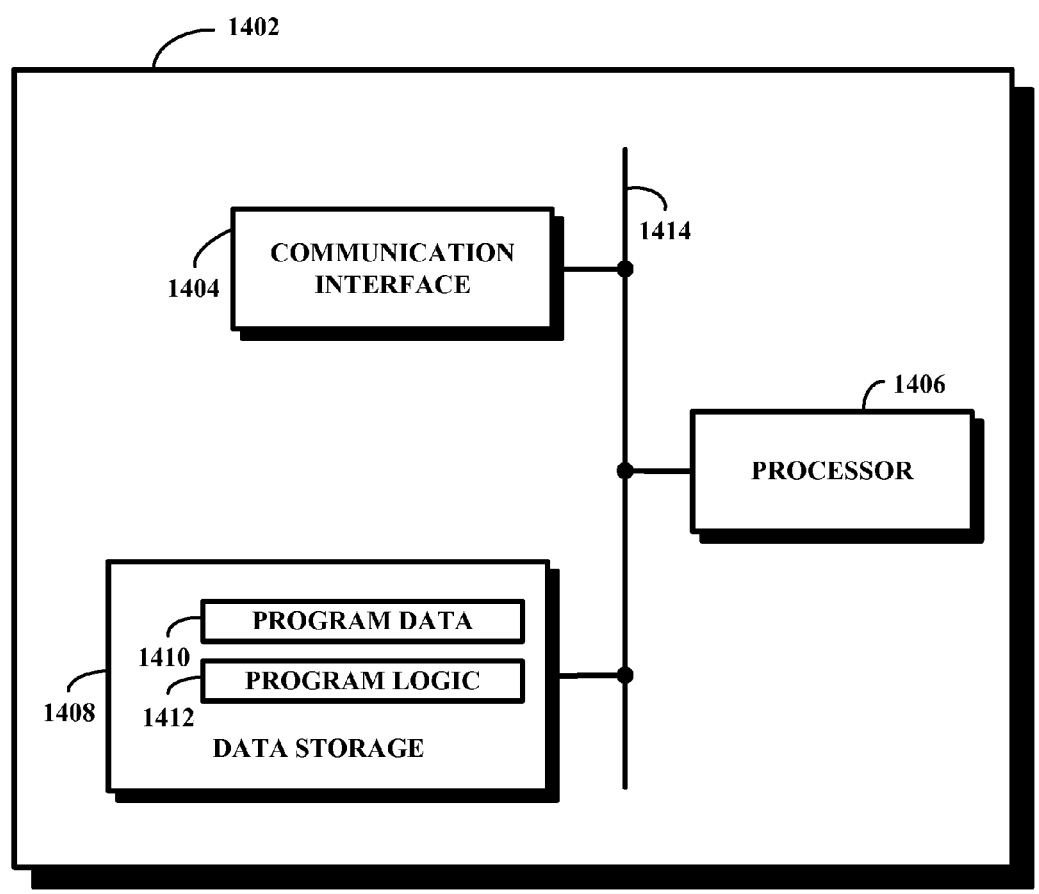
FIG. 14 is a simplified block diagram of an example computing device.

Generally, the methods and functions described herein may be carried out by a computing device, such as computing device 1402 of FIG. 14 described further below. Again, however, it should be understood that the computing device 1402 of FIG. 14 is set forth for purposes of example and explanation only, and should not be taken to be limiting. The present methods and functions may just as well be carried out in other systems having other arrangements.

a. Receive Document Data for a Corpus of Documents

At block 102, the method 100 includes receiving document data indicating (i) a corpus of documents and (ii) references between documents within the corpus of documents. In some instances, the document data may be stored in a digital archive or other database and transmitted to a computing device that is configured to perform the method 100. For instance, the computing device configured to perform the method 100 may access the document data from a database, or another computing device may provide the document data. The document data may indicate information associated with any type of rendered documents, such as electronic and/or printed documents. For example, the document data may identify each respective document of the corpus of documents. For each respective document, the document data may also include information such as a title of the document, date, page count, author(s), a list of other documents referencing the document, and a list of other documents referenced by the document, among other possible types of information. In one instance, the document data may be provided in the form of a tab-delimited table.

In one example, the corpus of documents may include individual scholarly papers or articles. In such an example, the references between documents may be citations from one scholarly article to one or more other scholarly articles.

In another example, the corpus of documents may include patent documents. For instance, the patent documents may include one or more of U.S. patents and patent applications, international patents and patent applications, or foreign patents and patent applications, petty patents, design patents, plant patents, utility models, as well as any other patent-related or patent application-related document. In such an example, a reference may be made or established from one document to another based on a citation in one patent document that references another patent document, an Office action (e.g., a document written by an examiner in a patent examination procedure that is mailed to an applicant for a patent) that is received in an application for a patent document and identifies one or more other patent documents, an information disclosure statement filed in an application for a patent document that references one or more other patent documents, or other similar citations or associations between patent documents.

In a further example, documents within the corpus of documents may correspond to individual inventors. For instance, for each inventor of each patent document, a document corresponding to the inventor and the patent document may be established. As an example, for a patent that lists inventors A and B, the patent may be represented by two documents in a corpus of documents. Each of the two documents may correspond to one of the respective inventors. Similarly, documents within the corpus of documents may correspond to individual patent firms that prepared a patent document. For instance, a corpus of documents may be formed where each document in the corpus corresponds to a document prepared by a particular patent firm.

In still another example, the corpus of documents may include litigation-related documents, such as court case summaries, court case rulings, and/or pre-trial documents. In such an example, the references between documents may include citations from one court case document to one or more other court case documents.

In still other examples, the corpus of documents may include webpages, contracts, licensing documents, government files, regulations, (e.g., SEC filings, FDA applications or warning letters, EPA notifications), newspapers, magazine articles, social media pages, emails, twitter feeds, and books. In one instance, documents in the corpus of documents may be genes and/or proteins. For example, genes may reference transcription factors responsible for their expression.

Generally, documents in the corpus of documents may be any type of documents that directly or indirectly reference one or more other documents. The documents of the corpus of documents need not be written documents. In some examples, the documents may include audio documents, video documents, or image documents. In an example in which documents include audio documents, a reference between documents may be determined based on common audio sequences existing within two documents. In an example in which documents include image documents, similar visual cues may serve as references between image documents. Other examples may exist, and the described examples are not meant to be limiting.

Additionally, in one example, a reference between two documents may be established based on usage data. For example, a system may be configured to track documents that are downloaded by a user as well as the order in which the documents are downloaded. Such traffic information may be indicative of an indirect reference between two documents. As a particular example, if a first document is downloaded, and subsequently a second document is downloaded, the flow between downloading the first document and then downloading the second document may be used to establish a reference from the first document to the second document. Thus, in some examples, the document data may indicate references between two documents that have been determined based on download traffic, or other types of flow, between the two documents.

Figure 2:
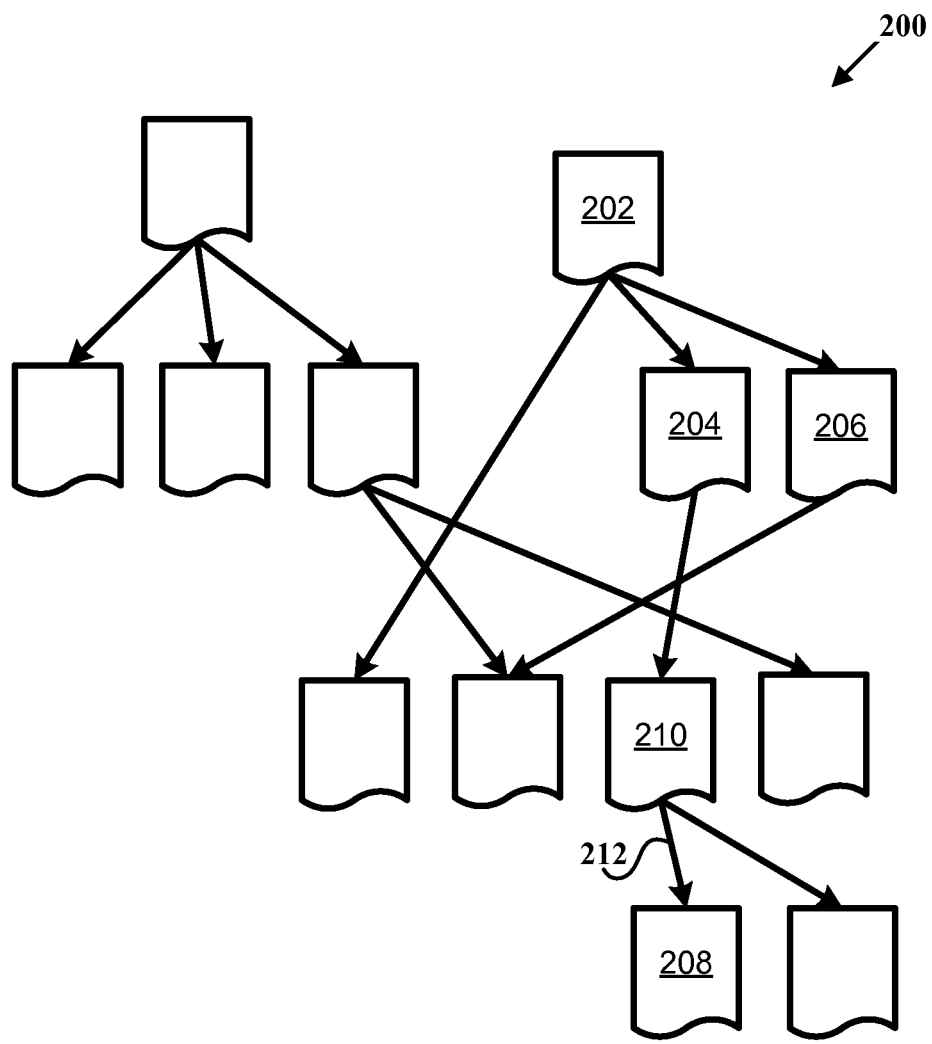
FIG. 2 is a conceptual illustration of an example corpus of documents.

FIG. 2 is a conceptual illustration of an example corpus of documents 200. As shown in FIG. 2, the corpus of documents 200 includes a plurality of references between two respective documents. A given document of the corpus of documents may reference any number of other documents. For instance, a given document may reference zero, one, or multiple other documents. As an example, document 202 references document 204 and document 206. Similarly, a given document may be referenced by zero, one, or multiple other documents. As an example, document 208 is referenced by document 210. In some instances, two documents (e.g., two documents published at approximately the same time) may reference each other (not shown).

In FIG. 2, an arrow from a first document to a second document represents a reference from the first document to the second document. For example, arrow 212 represents a reference from document 210 to document 208. In some examples, the first document may reference the second document within the text of the first document. In other examples, a reference from a first document to a second document may be indirectly associated with the first document. For instance, if the corpus of documents includes patent documents, the reference from the first document to the second document may be established based on an information disclosure statement that was filed during prosecution of the first document which identified the second document. Other examples of indirectly associated references are also possible.

The references between documents of the corpus of documents 200 are examples of time-directed references. In FIG. 2, documents that are above other documents represent documents that are published after the other documents. A given document of the corpus of documents 200 may reference document(s) that were published before the given document (documents below the given document in FIG. 2), but not documents that were published after the given document (documents above the given document in FIG. 2).

The configuration of the corpus of documents 200 is an example of a time-directed structure that is common for scholarly papers, patent documents, court case documents, and other types of documents, where each document directly or indirectly references one or more temporal predecessors. However, the configuration of the corpus of documents 200 shown in FIG. 2 is only an example. Other examples, with different characteristics, may also exist.

b. Determine a Network

At block 104, the method 100 includes determining a network including (i) two or more nodes and (ii) at least one directed edge. Each node of the network may correspond to a respective document in the corpus of documents. Also, each directed edge of the network may connect two respective documents. And each such directed edge may correspond to a reference between two documents in the corpus of documents. More specifically, a directed edge from a first node to a second node may correspond to a reference from a first document, represented by the first node, to a second document, represented by the second node.

Figure 3:
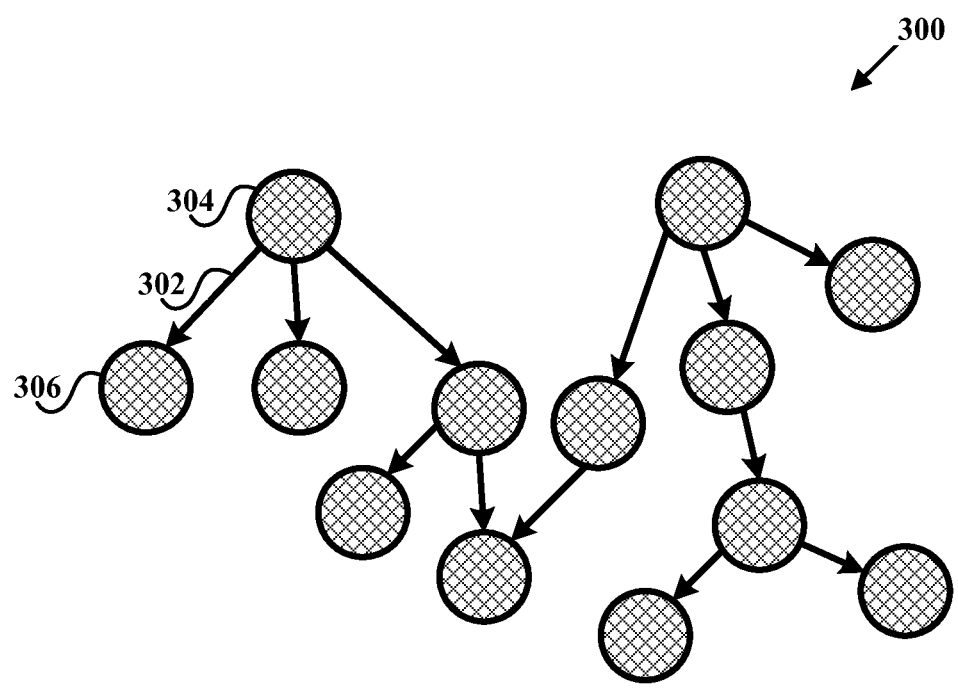
FIG. 3 is a conceptual illustration of an example network.

FIG. 3 is a conceptual illustration of an example network 300. The example network 300 is an example of a network that may be determined based on the corpus of documents 200 of FIG. 2 and the references between documents associated with the corpus of documents 200. The example network 300 may be determined by assigning each respective document of the corpus of documents 200 as a node of the network 300 and providing a directed edge between two nodes for each corresponding reference between two documents in the corpus of documents 200. In FIG. 3, each node of the example network is illustrated as a circle, and each directed edge is illustrated as an arrow. For example, as shown in FIG. 3, a directed edge 302 may be established between a first node 304 and a second node 306.

In one example, the received document data may be processed to allocate one node for each document in the corpus of documents. Subsequently, based on the allocation, for each reference between two documents indicated in the received document data, an appropriately located directed edge may be added to the network 200 between two nodes corresponding to the two documents.

Although the determination of the network at block 104 is described with respect to a visual depiction of the nodes and directed edges of the network, determining such a visual depiction of the network may not be necessary. For example, determining the network may involve determining a set of nodes and determining a set of ordered pairs of nodes. Each node may correspond to a document, and each ordered pair may correspond to a directed edge between a first node of the ordered pair and a second node of the ordered pair. Thus, determining the network at block 104 may generally involve determining the nodes and directed edges of the network, and storing information pertaining to the determined nodes and directed edges of the network in memory for further use in accordance with other blocks of the method 100.

c. Determine a Hierarchical Partition

At block 106, the method 100 includes determining a hierarchical partition of the documents based on the directed edges of the network. The hierarchical partition may define a plurality of nested modules, and each module in the plurality of nested modules may be associated with one or more respective documents within the corpus of documents. Generally, a partition may be a classification of nodes into jointly comprehensive, mutually exclusive, modules. However, partitions may also overlap in other examples (i.e., nodes may be in more than one module). A module may be a group of nodes. Nodes in a module may be closely connected to one another and loosely connected to other nodes in the network. A hierarchical partition may therefore define an arrangement of modules that are represented as being "above", "below", or "at the same level as" one another. Thus, the determined hierarchical partition may specify which documents are associated with which modules, submodules, subsubmodules, and so on.

Before describing example approaches for determining a hierarchical partition, a brief overview of a flow-based and information theoretic clustering method, called the map equation, is provided. The map equation has been shown to be a fast, accurate, and effective method for finding structure in large networks. For example, minimizing the map equation over all possible modular configurations of a network may be used to help determine the optimal modular description of the network with respect to the dynamics on the network.

Following the description of the map equation, a more generalized form of the map equation is discussed. In particular, a hierarchical map equation is provided. The hierarchical map equation described below may be used, for instance, to determine: into how many hierarchical levels a given network may be organized; how many modules are present at each hierarchical level; and which nodes are members of which modules.

Next, two example techniques for determining a hierarchical partition using the hierarchical map equation are described. Each of the example techniques provides an example of determining a hierarchical partition of the documents based on the directed edges of the network in accordance with block 106.

Generally, the map equation exploits the duality between compressing data and inferring structure. Such a duality is, for example, explored in the branch of statistics known as minimum description length statistics, where the goal is to determine a hypothesis for a given data set that leads to the best compression of the data. The map equation quantifies a minimum description length for a data set and can be applied to detect two-level or multi-level community structures in a network. Specifically, the map equation uncovers community structures of nodes in a network by modeling a process of flow over the directed edges of that network.

Applying the map equation to a network can be visualized as following the path of a random walker from node to node to node as the random walker moves around on the directed edges of a network. Often, the random walker may temporarily be located in highly interconnected groups of nodes, or modules, with relatively long persistence times. To describe the structure of the network, a trace of the random walker's path may be encoded in a compressed message. In one example, the compressed message uses module codewords for transitions between modules and node codewords that can be reused between modules. To make the compressed message unambiguous, an index codebook may distinguish which module codebook is active for a given portion of the compressed message.

Ultimately, the map equation measures the average description length, the average number of bits per step that are used to trace the random walker's path. Maximum compression is achieved when the modular structure of the codewords matches the modular structure of the network. The map equation is designed to take advantage of the fact that a network structure often has localized regions of small groups of nodes where a random walker will stay for long persistence times and reveal those localized regions. Therefore, minimizing the map equation over all possible modular configurations may be used to determine the best modular description of the network with respect to the dynamics on the network. Note that using the map equation does not require that an actual compressed message be derived for a given partition. The map equation reveals how efficient an optimal coded message would be for any given partition, without actually devising that coded message.

Additionally, the determination of the modular description of the network is often dependent on a ranking algorithm that is used to determine a relative value of each node in a network. For instance, a ranking algorithm may be used to establish a stationary distribution that indicates a visitation rate at each node during a random walk, for example. Information from the stationary distribution may then be used to determine the index codebook. Thus, ranking and hierarchically classifying may be intertwined.

Referring back to the method 100 and block 106, in one example, to ultimately determine a hierarchical partition that reveals patterns at multiple levels of a network, a process of flow on the network may be modeled and analyzed using a hierarchical map equation. While the map equation employs a single index codebook to encode a compressed message, using a separate index codebook for each level of a multi-level hierarchy makes it possible to exploit the fact that modules themselves are often organized into larger modules.

Figure 4:
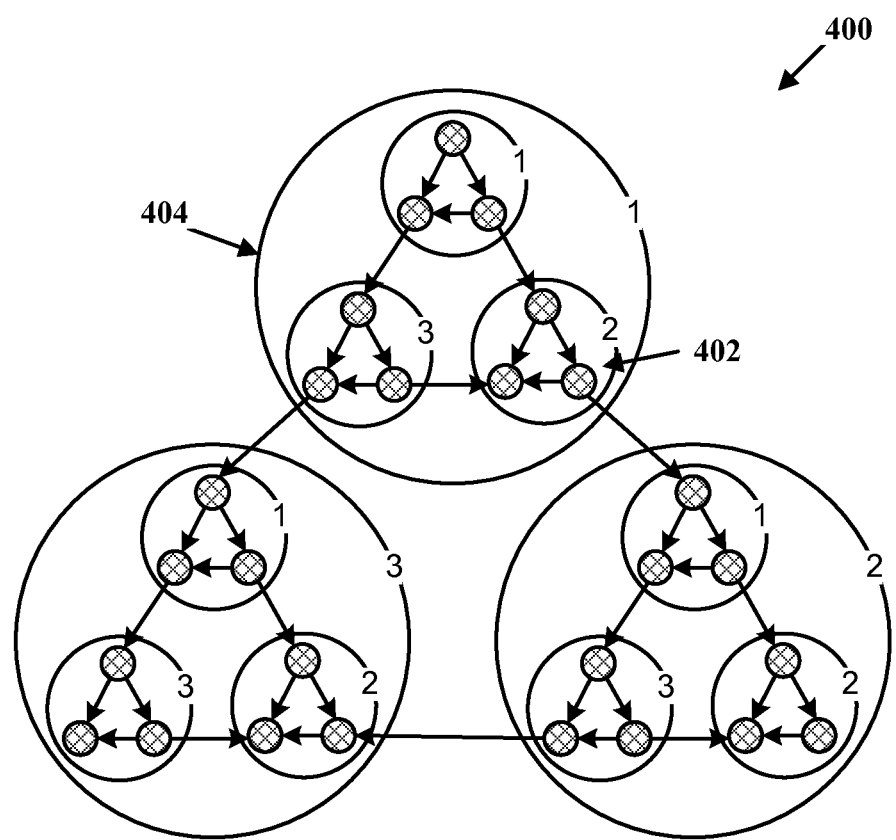
FIG. 4 is a conceptual illustration of a hierarchical cluster.

Broadly, the hierarchical map equation releases the constraint of a single index codebook and allows for an arbitrary number of hierarchically nested index codebooks that identify movement between modules, submodules, subsubmodules, etc. FIG. 4 is a conceptual illustration of a network that has been partitioned into a hierarchical cluster 400. As shown in FIG. 4, each node is a part of a submodule 402 that includes three nodes. Further, each submodule 402 is part of a module 404 that includes three submodules 402. To encode a compressed message that describes a trace of a random walker throughout the nodes of the hierarchical cluster 400, each module 404 may be associated with a respective index codebook, and each submodule 402 within each module 404 may also be associated with a respective index codebook. Note that the example hierarchical cluster 400 is provided for purposes of example and explanation, and the example is not meant to be limiting.

Formally, for a hierarchical map M of n nodes partitioned into m modules, for which each module i has a submap $M^i$ with $m^i$ submodules, for which each submodule ij has a submap $M^{ij}$ with $m^{ij}$ submodules, and so on, the hierarchical map equation takes the form of Equation 1:

$$L(M) = q_{\curvearrowright} H(Q) + \sum_{i=1}^{m} L(M^i) \qquad (1)$$

with the description length of submap $M^i$ at intermediate levels given by Equation 2:

$$L(M^i) = q_{\circlearrowright}^i H(Q^i) + \sum_{j=1}^{m^i} L(M^{ij}) \qquad (2)$$

and at the finest modular level by Equation 3:

$$L(M^{ij}) = p_{\circlearrowright}^{ij\cdots k} H(P^{ij\cdots k}). \qquad (3)$$

At each submodule level, $q_{\curvearrowright}^i$ is the rate of codeword use for entering the $m_i$ submodules or exiting to a coarser level and $H(Q^i)$ is the frequency-weighted average length of the codewords in the subindex codebook. At the finest level, $p_{\circlearrowright}^{ij\cdots k}$ is the rate of codeword use for visiting nodes in submodules ij . . . k or exiting to a coarser level and $H(P^{ij\cdots k})$ is the frequency-weighted average length of the codewords in the submodule codebook.

In order to determine a hierarchical structure that optimally represents the structure with respect to flow over the directed edges of the network, a hierarchical partition of the network that minimizes the hierarchical map equation over all possible hierarchical partitions of the networks may be determined. Any greedy approach (fast but inaccurate) or Monte Carlo-based (accurate but slow) approach can be used to minimize the hierarchical map equation.

According to a first example approach for determining the hierarchical partition of the documents based on the directed edges of the network, a modified version of the search algorithm described in the publication entitled "The Map Equation" by M. Rosvall, D. Axelsson, and C. Bergstrom published in volume 178 of The European Physical Journal Special Topics (2009), which is herein incorporated by reference in its entirety, may be used.

The above-referenced search algorithm was designed for use with the map equation. At a high level, the algorithm proceeds as follows: neighboring nodes are joined into modules, which subsequently are joined into supermodules, and so on. First, each node may be assigned to its own module. Then, in random sequential order, each node may be moved to the neighboring module that results in a largest decrease of the map equation. If no move results in a decrease of the map equation, the node may stay in its originally assigned module. The process may be repeated, each time in a new random sequential order, until no move generates a decrease of the map equation. Additionally, the algorithm can be further improved by allowing for submodule movements and/or single-node movements.

For instance, to allow for submodule movements, each cluster may be treated as a network on its own and the main algorithm may be applied to the cluster. This procedure generates one or more submodules for each module. Then all submodules are moved back to their respective modules of the previous step. At this stage, with the same partition as in the previous step but with each submodule being freely moveable between the modules, the main algorithm is re-applied.

To allow for single-node movements, each node may be re-assigned to be the sole member of its own module. Then all nodes may be moved back to their respective modules of the previous step. At this stage, with the same partition as in the previous step, but with each single node being freely moveable between the modules, the main algorithm may be re-applied.

The algorithm described above may be modified to explore multi-level solutions using the hierarchical map equation. In one example, the algorithm may be modified to recursively try to add extra index codebooks both at coarser and finer levels. For example, the modified algorithm may successively increase and decrease the depth of difference branches of the multilevel code structure to try further compress a representation of the structure of the network.

In a further example modification, to reduce the small cohesive effect of random teleportation, the hierarchical map equation may be modified to only measure the description length of steps following links and exclude the steps associated with random teleportation. To exclude random teleportation steps from the description length, the ergodic node visit frequencies $p_\alpha$ for $\alpha=1 \ldots n$ with random teleportation probability $\tau=0.15$ may be calculated. Following, for every node $\alpha$ and for all its outgoing links with relative weight $w_{\alpha\beta}$ to node $\beta$, the probability that that random walker does not teleport but rather follows a link in a given step may be calculated using Equation 4:

$$q_{\alpha \curvearrowright \beta} = (1-\tau) p_\alpha w_{\alpha\beta}. \qquad (4)$$

The node visit frequencies may then be calculated using Equation 5:

$$p_\alpha = \tau_\beta{}^\alpha q^{\alpha \curvearrowright \beta}. \qquad (5)$$

At the coarsest level, the relative rate of codeword use may be found using Equation 6:

$$Q = \{q^i_\curvearrowright / q_\curvearrowright\} = q^1_\curvearrowright / q_\curvearrowright, q^2_\curvearrowright / q_\curvearrowright, \ldots, q^m_\curvearrowright / q_\curvearrowright \qquad (6)$$

where the per-step average flow into the modules and the total codeword use is:

$$q_\curvearrowright = \Sigma_{i=1}^m q^i_\curvearrowright. \qquad (7)$$

The Shannon information of movements at the coarsest level is therefore:

$$q_\curvearrowright H(Q) = q_\curvearrowright \left( -\sum_{i=1}^m \frac{q^i_\curvearrowright}{q_\curvearrowright} \log \frac{q^i_\curvearrowright}{q_\curvearrowright} \right). \qquad (8)$$

At the intermediate level, the relative rate of codeword use is found using Equation 9:

$$Q^i = q^i_\curvearrowright / q^i_\circlearrowleft, q^{i1}_\curvearrowright / q^i_\circlearrowleft, \ldots, q^{im^i}_\curvearrowright / q^i_\circlearrowleft \qquad (9)$$

where the total codeword use is:

$$q^i_\circlearrowleft = q^i_\curvearrowright + \tau_{j=1}^{m^i} q^{ij}_\curvearrowright \qquad (10)$$

and the Shannon information of movements in the submodule is therefore:

$$q^i_\circlearrowleft H(Q^i) = q^i_\circlearrowleft \left( -\frac{q^i_\curvearrowright}{q^i_\circlearrowleft} \log \frac{q^i_\curvearrowright}{q^i_\circlearrowleft} - \sum_{i=1}^{m^i} \frac{q^{ij}_\curvearrowright}{q_\curvearrowright} \log \frac{q^{ij}_\curvearrowright}{q_\curvearrowright} \right). \qquad (11)$$

Finally, at the finest levels, the relative rate of codeword use is:

$$P^{ij \ldots k} = q^{ij \ldots k}_\curvearrowright / p^{ij \ldots k}_\circlearrowleft, \{p_{\alpha \in ij \ldots k} / p^{ij \ldots k}_\circlearrowleft\} \qquad (12)$$

where the total codeword use is:

$$p^{ij \ldots k}_\circlearrowleft = q^{ij \ldots k}_\curvearrowright + \Sigma_{\alpha \in ij \ldots k} P_\alpha \qquad (13)$$

and the Shannon information of movements is therefore:

$$p^{ij \ldots k}_\circlearrowleft H(P^{ij \ldots k}) = \qquad (14)$$
$$p^{ij \ldots k}_\circlearrowleft \left( -\frac{q^{ij \ldots k}_\curvearrowright}{p^{ij \ldots k}_\circlearrowleft} \log \frac{q^{ij \ldots k}_\curvearrowright}{p^{ij \ldots k}_\circlearrowleft} - \sum_{\alpha \in ij \ldots k} \frac{P_\alpha}{p^{ij \ldots k}_\circlearrowleft} \log \frac{P_\alpha}{p^{ij \ldots k}_\circlearrowleft} \right).$$

As described above, the hierarchical map equation measures the per-step average code length used to describe a random walker's movements along directed edges between nodes of a network, for a given hierarchical partition. The modified algorithm described above is one example of a fast stochastic recursive search algorithm that may be used, at block 106, to determine the hierarchical partition.

The example fast stochastic recursive search algorithm described above works by tracing long paths that move along directed edges of a network, and requires nearly ergodic flows to function effectively. In many examples, a network that is formed based on a corpus of documents that exhibits time-directedness may be far from ergodic. Rather, such a network may take the form of an acyclic directed graph or acyclic digraph.

The hierarchical map equation seeks to compress the dynamics set by the standard PageRank algorithm. (The standard PageRank algorithm is further described below.) Consequently, the hierarchical map equation suffers from the same problems as PageRank when applied to time-directed networks. For example, when PageRank is applied to a time-directed network, trails of references between documents move inexorably back in time as the directed edges of the network are followed, and a stationary distribution of a random walker is heavily time-biased. The random walker is essentially drawn inexorably back in time, visiting documents with ever-earlier publication dates as it follows the directed links of the network. Modeling the flow of a random walker on a time-directed network in the form of an acyclic digraph network using a two-mode dynamics approach overcomes the problem. The two-mode dynamics approach is another example approach that may be used to determine the hierarchical partition at block 106, and is further described below.

The standard PageRank algorithm, well known to one of ordinary skill in the art, is a one-mode dynamics approach and works by tracing a random walker on a network. The frequency at which the random walker visits different nodes gives the ranking of the nodes. Most approaches to PageRank employ a single Markov chain that includes a small teleportation probability added to the Markov chain. Teleportation, random jumps between the nodes at a certain rate, is added to the path of the random walker in an effort to obtain a unique solution.

The two-mode dynamics approach to modeling the dynamics of PageRank makes it possible to efficiently map a corpus of documents into nested modules without forced long paths. The typical approach to modeling the dynamics of PageRank uses a single Markov chain to determine both the starting positions and the movements from those positions. In principle, there is no reason why a single Markov chain needs to be used to determine both the starting positions and the movements from those positions. In the two-mode dynamics approach, instead of using a single aperiodic irreducible Markov chain R to both set start frequencies and to determine moves from each node, one aperiodic irreducible Markov chain S is used to set starting frequencies for each node in an initialization step, and a second Markov chain T covering the same domain is used to specify the moves from each node in a ranking step. In particular, in the two-dynamics approach, teleportation involves teleporting to links and splitting the flow equally between upstream and downstream nodes along the directed links to determine starting positions, and following links downstream in the subsequent moves from each node.

With respect to determining a hierarchical partition, the two-mode dynamics approach amounts to looking at the encoding problem one step at time, and only minimizing the expected description length of a single step of a random walk. For mapping the hierarchy of a network, the two-mode dynamics approach can be thought of as following an infinitely long Markov chain but ignoring the teleportation steps that guarantee ergodicity and only encoding the important ranking steps. Advantageously, only encoding the important ranking steps of the two-mode dynamics approach reveals important structures and efficiently avoids exaggerated time-biased ranking.

While multiple example approaches for determining the hierarchical partition at block 106 have been described, other examples are also possible. The described algorithms and approaches for determining the hierarchical partition are not meant to be limiting.

d. Cause a Graphical Display to Provide a Visual Indication

At block 108, the method 100 includes causing a graphical display to provide a visual indication of one or more of the plurality of nested modules. The graphical display may be any type of display device, such as a display device that is communicatively coupled to a computing system that is configured to perform the method 100. In one example, a list of modules at a given hierarchical level may be caused to be displayed. In another example, an indication of one or more of the plurality of nested modules may be provided in the form of a multi-scale map that is part of a hierarchical browser, as further described below. Other examples are also possible.

II. Additional Functions and Example Applications

The example method 100 may include additional blocks. For example, the method 100 or portions of the method 100 may be combined with other blocks to perform any of the additional functions described below, or may be combined with any of the other methods described below.

a. Ranking

In some examples, a rank value associated with each respective document of a corpus of documents may be determined. The rank value may be an objectively determined metric associated with each respective document. In one example, the rank value associated with each respective document is determined based at least in part on a respective number of references to the respective document and the rank value associated with each of one or more documents referring to the respective document.

The ranking algorithm described below, which may be referred to as the Eigenfactor algorithm, provides an example methodology for determining which nodes in a network may be the most important or influential by determining a rank value for each node. If each node corresponds to a document in a corpus of documents, the rank value of a node may correspond to a rank value of a respective document within the corpus of documents.

When applied to a network of connected nodes, the ranking algorithm determines a modified form of the eigenvector centrality of each node in the network. The intuition behind eigenvector centrality is that important nodes are those which are linked to by other important nodes. The ranking algorithm models a random walk on a network. For example, the network may be similar to the example network 300 of FIG. 3 where each node corresponds to a document in a corpus of documents and directed edges between the nodes are determined based on references between documents in the corpus of documents. The random walk may be described by the column-stochastic from of a cross-citation matrix R. The cross-citation matrix R may be a square having dimensions n×n, where n corresponds to the number of nodes in the network and the value of $R_{ij}$ for the cross-citation matrix is 1 if there is a directed edge from node j to node i, and otherwise is 0. The cross-citation matrix R may be normalized by the column sums of R to determine a column-stochastic matrix H.

Given the matrix H, a new stochastic matrix P corresponding to a Markov process may be defined by equation 15:

$$P = \tau H + (1-\tau) a \cdot e^T \qquad (15)$$

where a is a column vector such that $a_i = 1/$(total number of documents), and $e^T$ is a row vector of 1's. According to Equation 15, the matrix P corresponds to a Markov process, which with probability $\tau$ follows a random walk on the network and with probability $(1-\tau)$ teleports to a random node.

The leading eigenvector r of the matrix P may then be solved for. Given the leading eigenvector $\pi$, a vector of rank values V for each node may be determined using Equation 16:

$$V = 100 \frac{H\pi}{\sum_i [H\pi]_i}. \qquad (16)$$

Thus, the ranking algorithm may be used to determine a rank value associated with each node and corresponding document of a corpus of documents. Advantageously, the rank values determined using the ranking algorithm are additive metrics. To determine the total rank value for a group of nodes, the rank value for each respective node may be summed Such a summation may be useful for determining the total rank value of a patent portfolio assigned to a given company, for example.

In other examples, other ranking algorithms may also be used. For instance, in one example, the described ranking algorithm may be extended using a two-mode dynamics approach that is similar to the two-mode dynamics approach described above. Instead of using a single aperiodic irreducible Markov chain to both set starting frequencies and to determine moves from each node, one aperiodic irreducible Markov chain may be used to set starting frequencies for each node in an initialization step, and a second Markov chain covering the same domain may be used to specify the moves from each node in a ranking step.

Note that the described ranking algorithms are examples of ranking algorithms that may be used to determine rank values associated with each document. Other ranking algorithms and approaches may also exist.

b. Labeling

Hierarchically classifying a large corpus of documents into a plurality of nested modules may reveal a large number of modules, submodules, subsubmodules, etc. Accordingly, it may be useful to turn to semantic labeling approaches to automatically assign names to modules, submodules, subsubmodules, etc. For instance, a label for a respective module (e.g., a module, a submodule, a subsubmodules, etc.) may be determined based on content of documents associated with the module.

In one example, an automated text-mining system may determine informative (e.g., mutual-information maximizing) bigrams, trigrams, or n-grams associated with a respective module based on content of documents associated with the module. The determined bigram, trigram, or n-gram may then be assigned as the label for the module. In a further example, a rank value associated with each respective document of the module may be used to weight any detected bigrams, trigrams, or n-grams associated with the module.

In another example, a rank value associated with each respective document may be used to determine a sample group of documents that is representative of the module. For example, the top n documents associated with the module, as determined by the highest rank value, may be selected as a sample group. An automated text-mining system may then determine informative bigrams, trigrams, or n-grams, associated with the sample group based on the mutual content within documents of the sample group. A detected bigram, trigram, or n-gram associated with the sample group may then be assigned as a label for the module.

In yet another example, labels can be assigned by human operators to reflect the type of documents within a determined module. The described examples for labeling are not meant to be limiting, and other examples are also possible.

In one example, determined labels may be used to describe natural and objective clusters of documents that are identified using the methods and systems described herein. Rather than arbitrary categories, such as art classes typically used by patent offices, for example, the methods and systems described herein can identify a module of patent documents that have more affinity and similarity within one another than with patent documents outside the module.

c. Navigating

Automatically classifying as well as ranking and/or labeling a corpus of documents may facilitate new mechanisms for navigating the corpus of documents. In one example, a plurality of nested modules that have been determined by a hierarchical partition may be displayed in a multi-scale map. Individual modules may be labeled so that a user may hierarchically browse through different modules to reveal submodules and/or documents associated with the individual models.

Figure 5A:
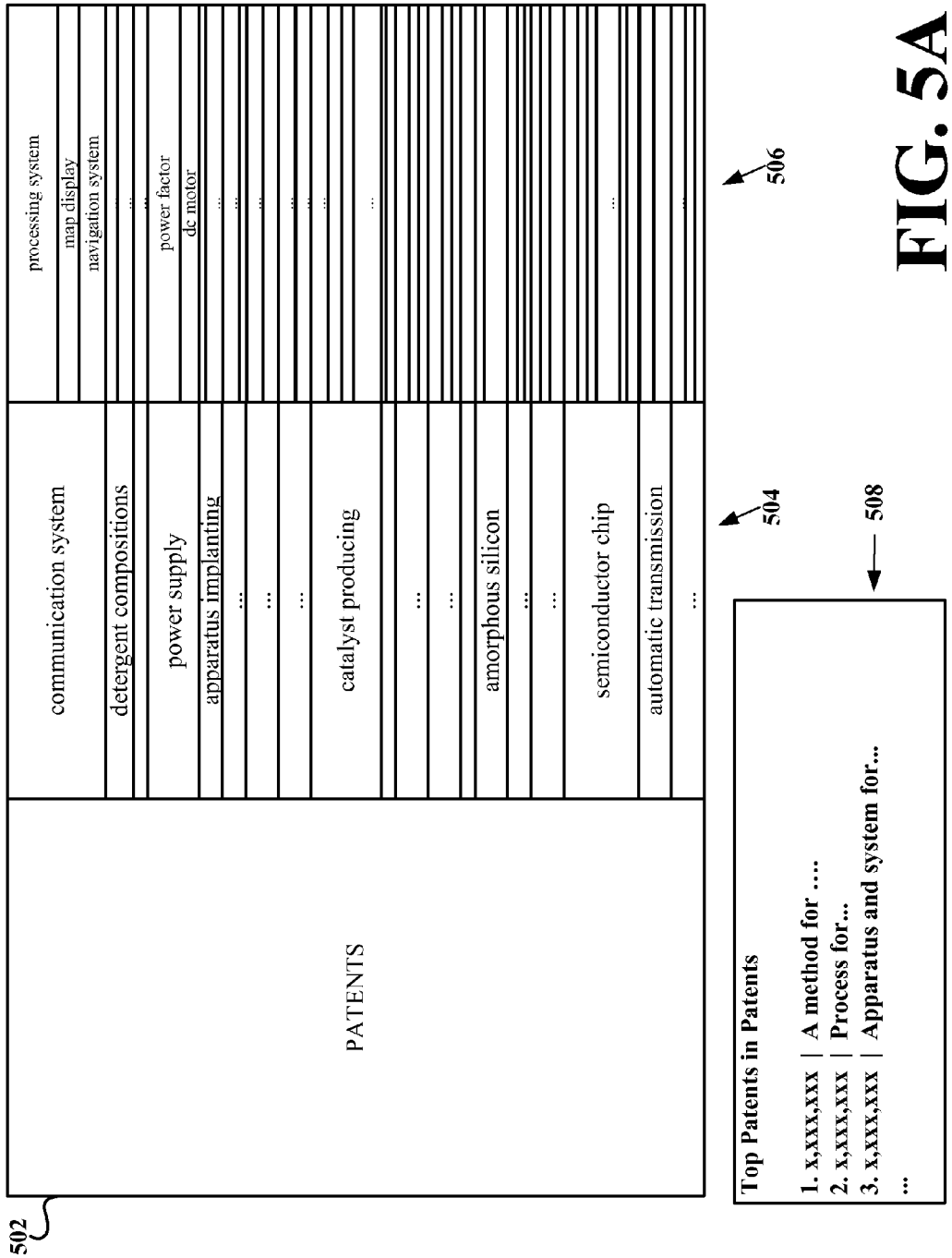

FIGS. 5A and 5B are conceptual illustrations of a multi-scale map. The conceptual illustrations shown in FIGS. 5A and 5B are example screenshots of a hierarchical browser that may be used for navigating a set of hierarchically classified patent documents. Although FIGS. 5A and 5B are described with respect to patent documents, the examples are not meant to be limiting, and may equally apply to other types of documents.

As shown in FIG. 5A, modules are represented hierarchically in one of three vertical columns. In a left column, a top-level module 502, labeled as "Patents", represents a module that each document of a corpus of patent documents is associated with. For instance, each patent document may be broadly categorized as a patent.

In a middle column of FIG. 5A, a plurality of submodules 504 are shown. The plurality of submodules 504 represent second-level modules. Each patent document may be associated with one of the plurality of submodules 504. Additionally, in the right column of FIG. 5A, a plurality of submodules 506 are shown. Each of the plurality of submodules 506 are submodules of one of the plurality of submodules 504. Each patent document may therefore also be associated with one of the plurality of subsubmodules 506.

As an example, one or more patent documents may be associated with a "processing system" submodule. The one or more patent documents of the "processing system" submodule may also be associated with a "communication system" submodule. Similarly, a "map display" submodule and a "navigation system" submodule may be submodules of the "communication system" submodule.

In FIG. 5A, a size of each module (e.g., module, submodule, subsubmodule, etc.) is proportional to a total respective rank value of documents within the module. For instance, the size of the "communication system" submodule is larger than the "apparatus implanting" submodule because the total rank value of documents within the "communication system" submodule may be greater than the total rank value of documents within the "apparatus implanting" submodule.

Also shown in FIG. 5A is an ordered list 508 of patent documents for the module shown in the left column. For example, the ordered list 508 shows the highest ranked patent documents among all patent documents associated with the "Patents" module. In one instance, the ordered list 508 may be determined based on rank values associated with each patent document.

In one example, a computing system that implements a hierarchical browser may be configured to receive document-selection data indicating a selection of a particular module, and cause the multi-scale map to display an indication of one or more submodules within the particular module. Document-selection data, as described herein, may generally refer to any selection of a document, group of documents, module, group of modules, category, group of categories, or other information, that is provided via an input device. For instance, the input device may be a keyboard, mouse, touchpad, touchscreen, microphone, or other type of input device.

As one example of document-selection data indicating a selection of a particular module, a user may click on, or otherwise select, the "power supply" submodule. In response to receiving the document-selection data, the multi-scale map may be modified as illustrated in the screenshot of FIG. 5B. As shown in FIG. 5B, the "power supply" submodule is display in a left column. Additionally, submodules of the "power supply" submodule are displayed in a middle column, including a "power factor" and "dc motor" submodule. Further, nested submodules beneath the "power factor" and "dc motor" submodules are also displayed in a right column. For example, the "induction heating" and "current sharing" modules are shown as submodules of the "power factor" submodule.

In one example, the hierarchical browser may further allow a user to "drill-down" to a further hierarchical sub-level by selecting, for example, one of the "power supply", "dc motor", "induction heating", "current sharing", "brushless dc", or "induction motor" submodules. Similarly, the hierarchical browser may also be configured to allow a user to return back up to a previous hierarchical level by selecting an "up" option.

Additionally, in response to receiving document-selection data indicating a selection of the "power supply" submodule, an ordered list 510 of patent documents within the "power supply" submodule may be determined and displayed. The ordered list 510 of patent documents may be determined and displayed based on the rank value associated with patent documents associated with the "power supply" submodule.

The hierarchical browser may also allow a user to select a particular patent document within the ordered list 508 or the ordered list 510 to reveal more information about a particular document. For instance, in response to receiving document-selection data indicating a particular patent document, a visual indication of additional information about the particular document may be provided. The visual indication may include, for instance, an ID, year, inventor(s), listed category (e.g., group art unit determined by the U.S. Patent Office), category/module in which the patent document is hierarchically classified, and rank value, among other possible information. In some instances, the visual indication may also include a list of other patent documents indirectly or directly referencing the patent document and/or other patent documents indirectly or directly referenced by the patent document.

d. Searching

Figure 6:
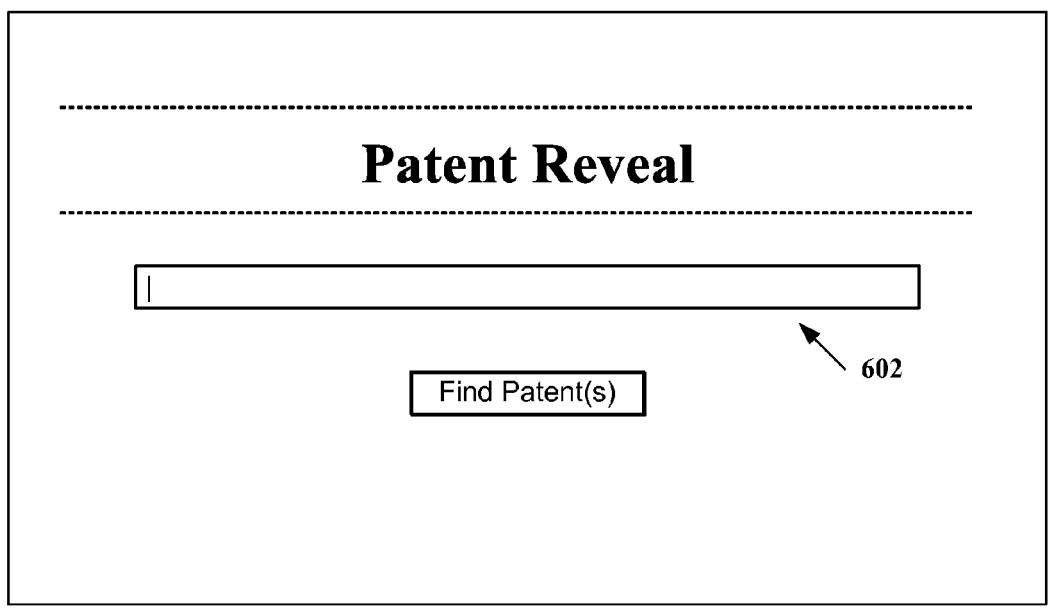
FIG. 6 is a conceptual illustration of a search prompt.

In some instances, a search engine that allows a user to search through a hierarchically classified data set may be provided. FIG. 6 is a conceptual illustration of a search prompt. The search engine may be configured to receive document-selection data that is provided via the search prompt. In one example, the document-selection data may be text entered into a search box 602 via a keyboard or keypad. In another example, the document-selection data may be text that has been converted from speech. The search engine may allow a user to search for particular patent documents by ID number (e.g., patent number or patent publication number), classified category/module, listed category (e.g., U.S. Patent Office group art unit), and/or keyword, among other possible search criteria.

In one example, the search engine may receive document-selection data indicating a particular category. For instance, a user may provide one or more keywords associated with the particular category. FIG. 7 illustrates example search results provided in response to receiving document-selection data indicating a selection of "virtual reality". As shown in FIG. 7, a first patent document titled "Method for virtual reality . . . " and a second patent document "Virtual reality system . . . " are provided, as well as other patent documents. The patent documents provided in FIG. 7 are shown ordered based on rank value. In other instances, the patent documents in the search results may be ordered by other criteria. Additionally, a user may be able to select a default ordering-criterion prior to searching, or may be able to re-order search results by selecting a new ordering-criterion after the search results have been provided.

In another example, the search engine may receive document-selection data indicating a particular patent document. For instance, FIG. 8A illustrates example search results provided in response to receiving document-selection data indicating a selection of patent document "x,123,xxx". As shown in FIG. 8A, various information identifying the patent document "x,123,xxx" is provided.

In one example, a hierarchically determined category/module (e.g., a lowest-level module determined by hierarchical classification) and a listed category (e.g., a group art unit determined by the U.S. Patent Office) may be shown. Color-coding may also be used to distinguish whether or not the patent document is listed in the same category as other patent documents of the same lowest-level module that the patent document was classified in. As an example, if the listed category of the patent document agrees with the listed category of the majority of other patent documents that are classified into the same module as the patent document, the listed category may be highlighted using a first color (e.g., green). If the listed category of the patent document is different than the listed category of the majority of other patent documents that are classified into the same module as the patent document, the listed category may be highlighted using a second, different color (e.g., red) to indicate the discrepancy. Such color-coding may be used to provide an indication of whether a natural and objective module of patent documents identified by automatic hierarchical classification provides a better grouping of patent documents than a predetermined art class, for instance.

In one instance, a user may further receive more information about references to and/or from the particular document. For example, FIG. 8B illustrates additional patent documents referenced by the "x,123,xxx" patent document. In one example, the patent documents referenced by the "x,123,xxx" patent document may be provided in response to a user clicking on the patent ID or the patent title. In another example, patent documents referencing the "x,123,xxx" patent document may automatically be provided in response to receiving document-selection data indicating the selection of the "x,123,xxx" patent document.

In some examples, aspects of the functionalities described with respect to FIG. 8B may be incorporated into the hierarchical browser described above with respect to FIGS. 5A and 5B. For instance, the hierarchical browser may be configured to provide additional patent documents referenced by a document in response to receiving document-selection data indicating a selection of a particular document. For instance, in response to receiving document-selection data indicating a selection of a particular document, a particular module associated with the particular document may be provided. In another instance, in response to receiving document-selection data indicating a selection of a particular patent document, one or more prior art documents associated with the particular patent document may be provided. For example, other patent documents associated with the module which the particular patent document is associated may be displayed in order based on rank value. Further, the other patent documents may be filtered based on a date associated with the particular patent document such that only other patent documents having dates prior to the particular patent document are provided.

In one instance, such a technique of identifying prior art may be able to identify prior art documents that may have otherwise been overlooked due to narrow or improper classifications of patent documents within a predetermined classification system (e.g., a patent office technology area). As an example, a first patent may be classified in a first art unit by a patent office, but the first patent may be classified in a given module by the hierarchical classification system described herein. The given module may include closely related patent documents that are not within the first art unit. As a result, prior art documents from the given category, that might have otherwise been overlooked because the prior art documents are located within a separate technology area with the patent office classification system, may be revealed.

In still another example, the search engine may receive document-selection data indicating a selection of a particular group of patent documents. For example, FIG. 9 illustrates example search results provide in response to receiving document-selection data indicating a selection of the "x,234,xxx", "x,345,xxx", and "x,456,xxx" patent documents. As shown in FIG. 9, if document-selection data indicates the selection of multiple patent documents, in some instances, the total rank value of the multiple patent documents may be provided.

e. Valuation

In an example in which a rank value is determined for each respective document of a corpus of documents, the rank value may provide an indication about the relative value (e.g., monetary, strength, influence) of a particular document. For example, if each document associated with a corpus of documents is a patent document, and an indication of a dollar value for one or more patent documents is known, the relative dollar value may be determined for additional patent documents. In one instance, a dollar value of a particular patent document may be known based on a dollar value awarded as part of a patent litigation. In another instance, a dollar value of a particular patent document may be known based on a dollar value that the patent document sold for from one party to another.

In one embodiment, a relative estimate of importance, strength, influence, and monetary value of any (or every) patent or patent application in a network may be determined. For instance, the relative estimate of one or any combination of importance, strength, influence, and monetary value may either be determined for all nodes in the network, or, alternatively, determined for any subset of nodes in a network.

As an example, to estimate one or more of each node's relative monetary value, strength, influence, or importance, each patent document in a network may be ordered based on rank value. Bounded estimates of one or any combination of monetary value, strength, influence, or importance may then be determined by associating objective measurements of monetary value, strength, influence or importance with corresponding patent documents. Such an association may be made by associating metadata with each patent document, for example. Metadata may generally be any type of information that is associated with a particular node or a group of nodes.

The objective measurements that are associated as metadata may then be used to estimate upper and lower bounds of monetary value, strength, influence, or importance. For example, one or more amounts of monetary damages resulting from patent infringement litigations may be associated with corresponding patent documents within a network. Based on one or more amounts of monetary damages associated with particular patent documents, estimates of a maximum and/or minimum litigation value of any other patent documents having higher or lower respective rank values.

In one example, infringement damages of $8,000,000 may be associated with Patent A and infringement damages of $10,000,000 may be associated with Patent C. Also, Patent A may have a higher rank value than Patent C. If a third patent, Patent B has a rank value intermediate between the rank values of Patent A and Patent C, an estimated litigation value of greater than $8,000,000 but less than $10,000,000 may be determined for Patent B. In another example, for a group of patents, Patents A, B, C, D, E, F, and G, arranged in rank value from highest to lowest, Patents A, B, C, and D, may have been held to valid in patent infringement litigation while Patents E, F, and G may have been held to be invalid. If another patent, Patent X, has a rank value that is intermediate between rank values of Patent B and Patent C, an estimate may be made that Patent X is more likely to be held valid than invalid. Similarly, if Patent Y, having an rank value between rank values of Patent F and Patent G, a determination may be made that Patent Y is more likely to be held to be invalid than valid. Thus, associating objective measurements with patent documents located within a network can reveal useful and predictive patterns with respect to the objective measurements or even other data.

In one case, if dollar values associated with multiple documents in a particular module are known, the dollar values may be used to determine a dollar value profile (e.g., an exponential, linear, or other type of curve) as a function of rank value. For instance, the profile may indicate an estimated relationship between dollar value and rank value. Given the rank value of a particular document, the profile may then be used to infer a dollar value of the particular document by fitting the rank value to the profile.

Generally, any type of regression method may be used to determine an objective measurement of importance, influence, strength, or monetary value based on known objective measurements and rank values associated with documents. Existing techniques for patent valuation or patent portfolio valuation may also be used to determine metadata for association with one or more patent documents.

Because the rank value is an objectively determined metric, other methods are also contemplated for determining a dollar value associated with a particular document based on a rank value of the document. Further, a dollar value of a group of documents may also be determined by summing the dollar value determined for each individual document of the group.

In other instances, metadata may also be used to constrain the configuration of a network of nodes. For instance, a network may be constrained to only include patent documents that have associated metadata indicating that a patent was held to be valid. As another example, a network of nodes may be filtered, based on metadata associated with the nodes, to only include patent documents that were published or filed in the year 2011. Other examples of filtering or constraining a network may also exist.

f. Identifying Technology Gaps

In some examples, the method 100 may be used to identify technology gaps or "white spaces" where little inventive action is occurring. For instance, if the corpus of documents includes patent documents, a total-connectionnumber for one, multiple, or all of the plurality of nested modules may be determined. The total-connection-number may be a total of one or more of: (a) a number of references from patent documents associated with a module to other patent documents associated with the module and (b) a number of references to patent documents associated with the module from other patent documents not associated with the module. Given the total-connection-number of one or more modules, one or more unconnected modules may be identified by comparing the total-connection-number to a total-connection-number threshold. For instance, if a total-connection number of a particular module is below a threshold, the module may be identified as an unconnected module. Such an unconnected module may represent a module from which technological features of patent documents within the module may be combined with other technological features associated with patent documents outside of the module to develop new technological innovations.

In another example, fuzzy partitioning may be used to identify technology gaps. Fuzzy partitioning may be referred to hierarchical partitioning where modules may overlap. For instance, nodes of a network may belong to two or more overlapping modules at the same level. If a network is hierarchically partitioned using fuzzy partition, it may be possible to identify, from the resulting partition, any modules that do not overlap with other modules. For instance, there may be modules that have nodes which are only associated with a single module at one level. Such modules, that do not overlap with other modules at the same level, may be identified as modules where technological features might be combined with technological features from other modules to yield new and interesting developments.

Other examples for identifying technology gaps may also exist, and the described example is not meant to be limiting. Generally, analyzing the structure of a plurality of nested modules may be useful to identify technology areas that are relatively unconnected and which may benefit from combining technological features from another area.

III. Second Example Method

Figure 10:
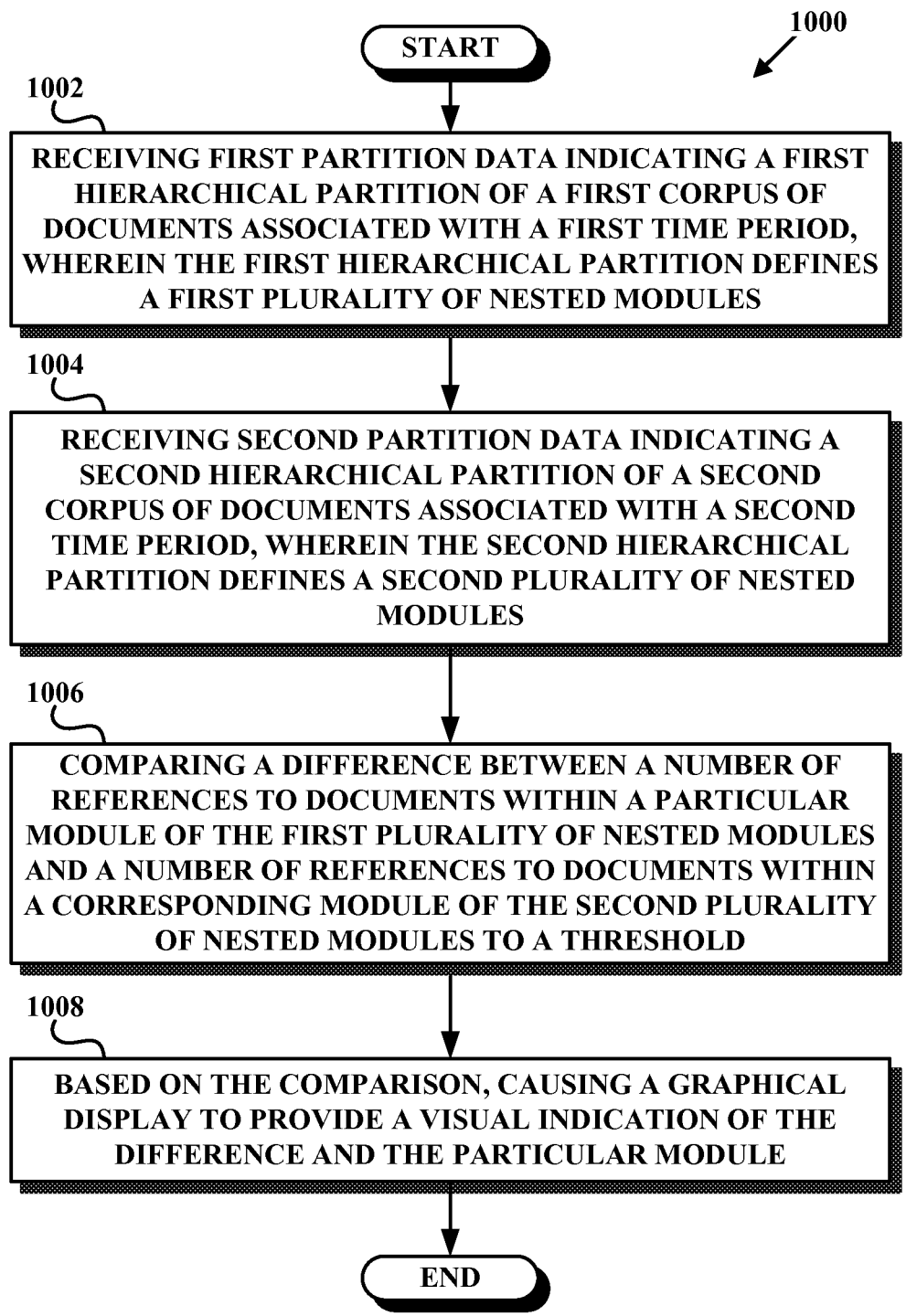
FIG. 10 is a flow chart of an example method for identifying a change in network structure over time.

FIG. 10 is a flow chart of an example method 1000 for identifying a change in network structure over time. In one example, the method 1000 may be used to identify locations within a hierarchically classified network where activity is relatively, high or low. For instance, if a hierarchical partition of a corpus of patent documents has been determined, the method 1000 may be used to identify locations (e.g., modules) within the corpus of patent documents where inventive activity is relatively high or low based on rates or trends in references to and/or from the module over time. The method 1000 may be performed by a computing device, such as the computing device 1402 of FIG. 14. In addition, one or more blocks of the method 1000 may be combined with one or more blocks of the method 100 of FIG. 1. Further details of the example method 1000 are now described.

At block 1002, the method 1000 includes receiving first partition data indicating a first hierarchical partition of a first corpus of documents associated with a first time period. The first hierarchical partition may define a first plurality of nested modules, and each module in the first plurality of nested modules may be associated with one or more respective documents within the first corpus of documents.

In one example, the first hierarchical partition may have been determined using the method 100 of FIG. 1. The first partition data received at block 1002 may therefore indicate a hierarchy of the nested modules and information regarding which documents are associated with which modules. The first plurality of nested modules may also be labeled based on semantic information from respective documents of each module of the first plurality. The first corpus of documents may include any type of documents that have references between them. For example, the first corpus of documents may be patent documents, scholarly publications, or court case documents, among other possibilities. The first time period may be a date range such as a range of years (e.g., 1995-2000), range of months (e.g., January 1999-December 1999), or other time range.

At block 1004, the method 1000 includes receiving second partition data indicating a second hierarchical partition of a second corpus of documents associated with a second time period. The second hierarchical partition may define a second plurality of nested modules, and each module in the second plurality of nested modules may be associated with one or more respective documents within the second corpus of documents.

The second partition data received at block 1004 may have some temporal relationship to the first partition data received at block 1002. For instance, the second corpus of documents may include the first corpus of documents and a plurality of additional documents that were published after the first time period. As an example, the first corpus of documents may be patent documents from 1979-1999 and the second corpus of documents may be patent documents from 1979-2009. As with the first partition data received at block 1002, the second partition data received at block 1004 may also have been determined using the method 100 of FIG. 1.

Thus, in one example, the first partition data received at block 1002 may represent a hierarchical network structure of a first corpus of documents at a first instance in time while the second partition data received at block 1004 may represent a hierarchical network structure of a second corpus of documents at a second instance in time that is later than the first instance in time.

Figure 11:
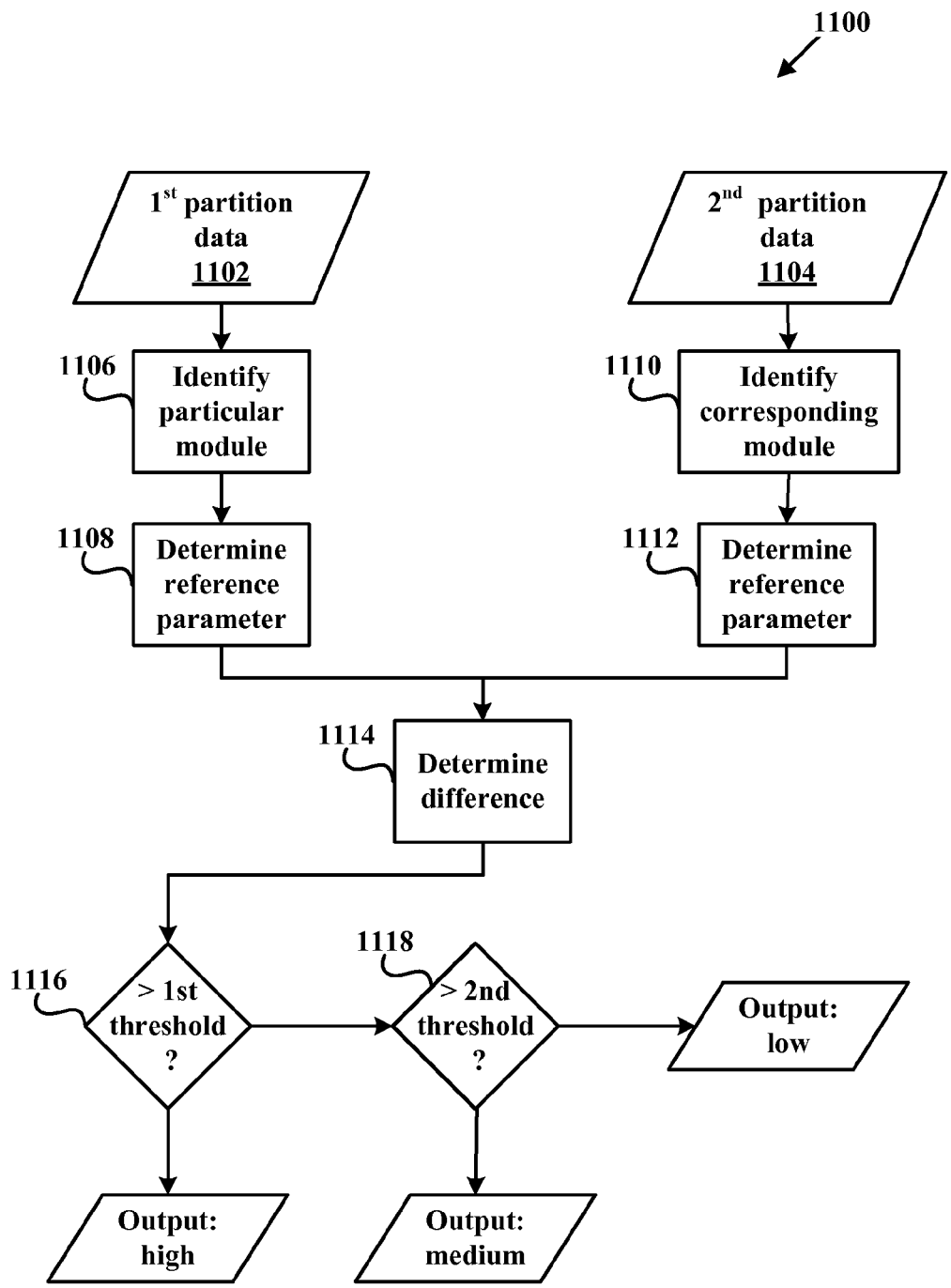
FIG. 11 is a flow diagram of an example approach for determining a level of change in network structure over time.

At block 1006, the method 1000 includes comparing a difference between a number of references to documents within a particular module of the first plurality of nested modules to a number of references to documents within a corresponding module of the second plurality of nested modules to a threshold. In one example, the determination at block 1006 may reveal a level of change associated with the particular module. For instance, FIG. 11 is a flow diagram of an example approach 1100 for determining a level of change in network structure over time.

Initially, first partition data 1102 and second partition data 1104 may be received. The first partition data 1102 may be the partition data received at block 1002 and the second partition data may be the partition data received at block 1004. Subsequently, at block 1106, a particular module may be identified. For instance, the particular module may be identified based on document-selection data indicating a selection of a particular module. Based on the identified module, at block 1108, a reference parameter associated with the particular module may be determined. For the example method 1000, the reference parameter may be a total number of references to documents within the particular module during the first time period.

Similarly, at block 1110, a module corresponding to the particular module may be identified within the second partition data 1104. For example, the corresponding module may be a module in the second partition data 1104 that has the same label as the particular module identified at block 1106. Subsequently, at block 1112, a total number of references to documents within the corresponding module during the second time period may be determined.

The determined numbers of references may be compared at block 1114 to determine a difference. In one example, the difference may be determined by subtracting the determined numbers of references. In another example, the difference may be a percentage increase or decrease. At blocks 1116 and 1118, the difference may be compared to a first threshold and, if necessary, a second threshold to qualify the difference as, for example, high, medium, or low. Note that the comparison described with respect to FIG. 11 is one example approach, and is not meant to be limiting.

Returning back to the example method 1000 of FIG. 10, at block 1008, the method 1000 includes based on the comparison, causing a graphical display to provide a visual indication of the difference and the particular module. In one example, the graphical display may list an indication of whether the difference was an increase or decrease as well as the label of the particular module, and optionally the corresponding module. In another example, the graphical display may list an indication of whether the difference was high, medium, or low.

In a further example, the method 1000 may be repeated for multiple modules of the received partition data. Additionally, the graphical display may be caused to generally provide a visual indication of changes in a network structure of the first hierarchical partition of the first corpus of documents and changes in a network structure of the second hierarchical partition of the second corpus of documents over time. For instance, the visual indication of changes in network structure of the first hierarchical partition and the network structure of the second hierarchical partition may be provided in the form of an alluvial diagram.

Figure 12:
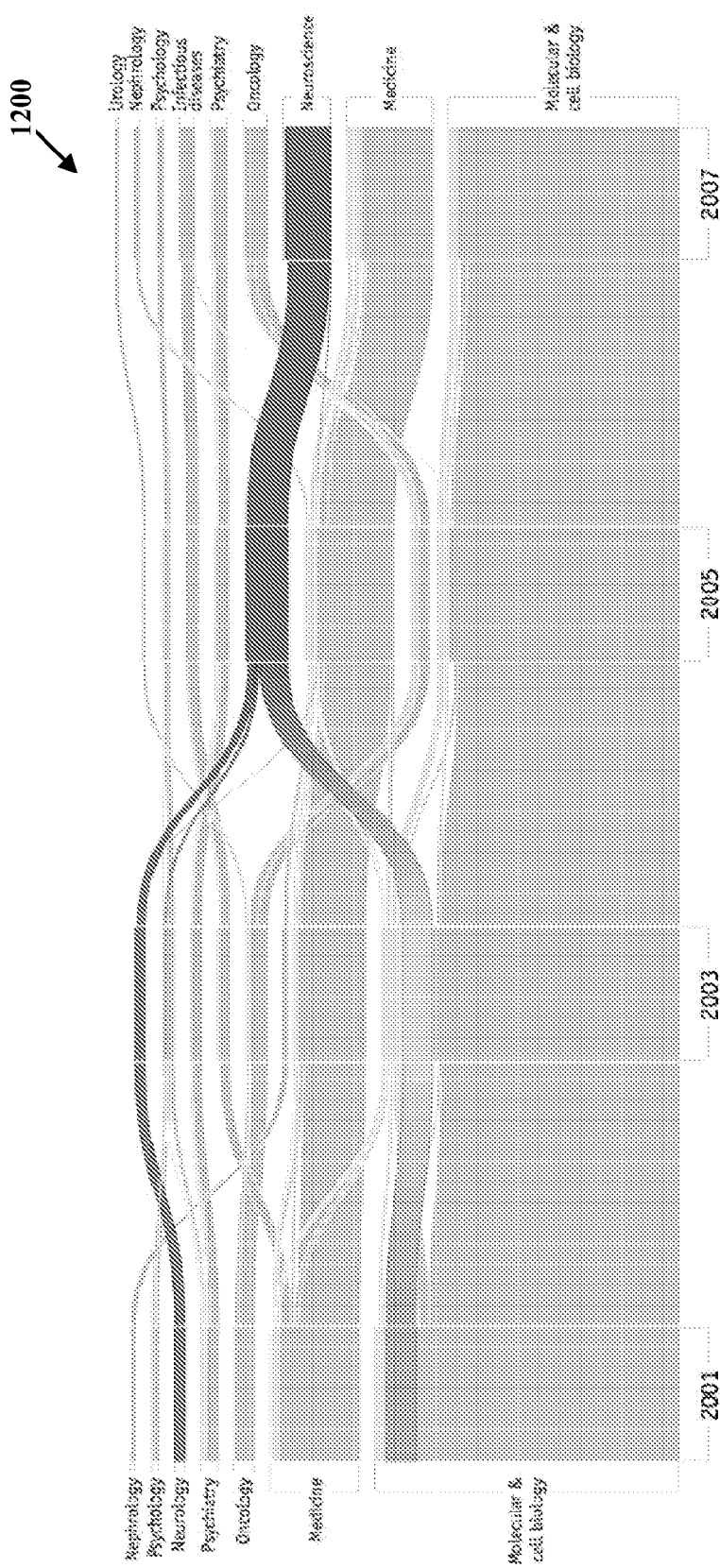
FIG. 12 is a conceptual illustration of an alluvial diagram.

FIG. 12 is a conceptual illustration of an alluvial diagram 1200. In the alluvial diagram 1200, four hierarchical partitions corresponding to 2001, 2003, 2005, and 2007, are shown. For the example of method 1000, the first hierarchical partition may be represented by the 2001 column while the second hierarchical partition may be represented by the 2003 column. In the alluvial diagram 1200, the horizontal blocks correspond to modules and are ordered by height. The height of each block corresponds to reference flow through documents of the corresponding module. The reference flow may include one or a combination of references from other documents to documents in the module and references from documents in the module to other documents. The alluvial diagram 1200 also illustrates how submodules within a module can split or merge with other submodules/modules over time.

In a further extension of the method 1000, changes in sources of references to documents of a particular module over time may be identified. For instance, for a first hierarchical partition corresponding to a first time period, a source-summary of the sources of any references to documents within a particular module may be determined. The source-summary may include a list of any other modules that had documents refer to documents within the particular module as well as the total number of references from each particular module of the list. Similarly, a source-summary of the sources of any references to documents within a corresponding module for a second hierarchical partition associated with a second time period may be determined. The source-summary associated with the first hierarchical partition and the source-summary associated with the second hierarchical partition may then be compared to identify if the source of documents that are referencing documents of the particular module is changing over time.

In another example, the method 1000 may be used to identify rapidly-developing areas of technology. For instance, if documents of the first corpus of documents and the second corpus of documents each comprise patent documents, the method 1000 may be used to identify rapidly-developing areas of patent activity. In one instance, the rapidly-developing areas may be identified based on a difference between (a) a number of references from patent documents within a particular module of the first plurality of nested modules to other patent documents within the particular module and (b) a number of references from patent documents within a corresponding module of the second plurality of nested modules to other patent documents within the particular module. If, for example, the difference in numbers of references is greater than a change-threshold, the module may be identified as a rapidly-developing area.

In still another example, the method 1000 may be used to identify newly-formed modules. For instance, if the first corpus of documents and the second corpus of documents each comprise patent documents, a module of the second plurality of nested modules may be identified as a newly-formed module if (a) the module is not a module within the first plurality of nested modules and (b) combines patent documents associated with two or more modules of the first plurality of nested modules.

IV. Example Document Report

Figure 13:
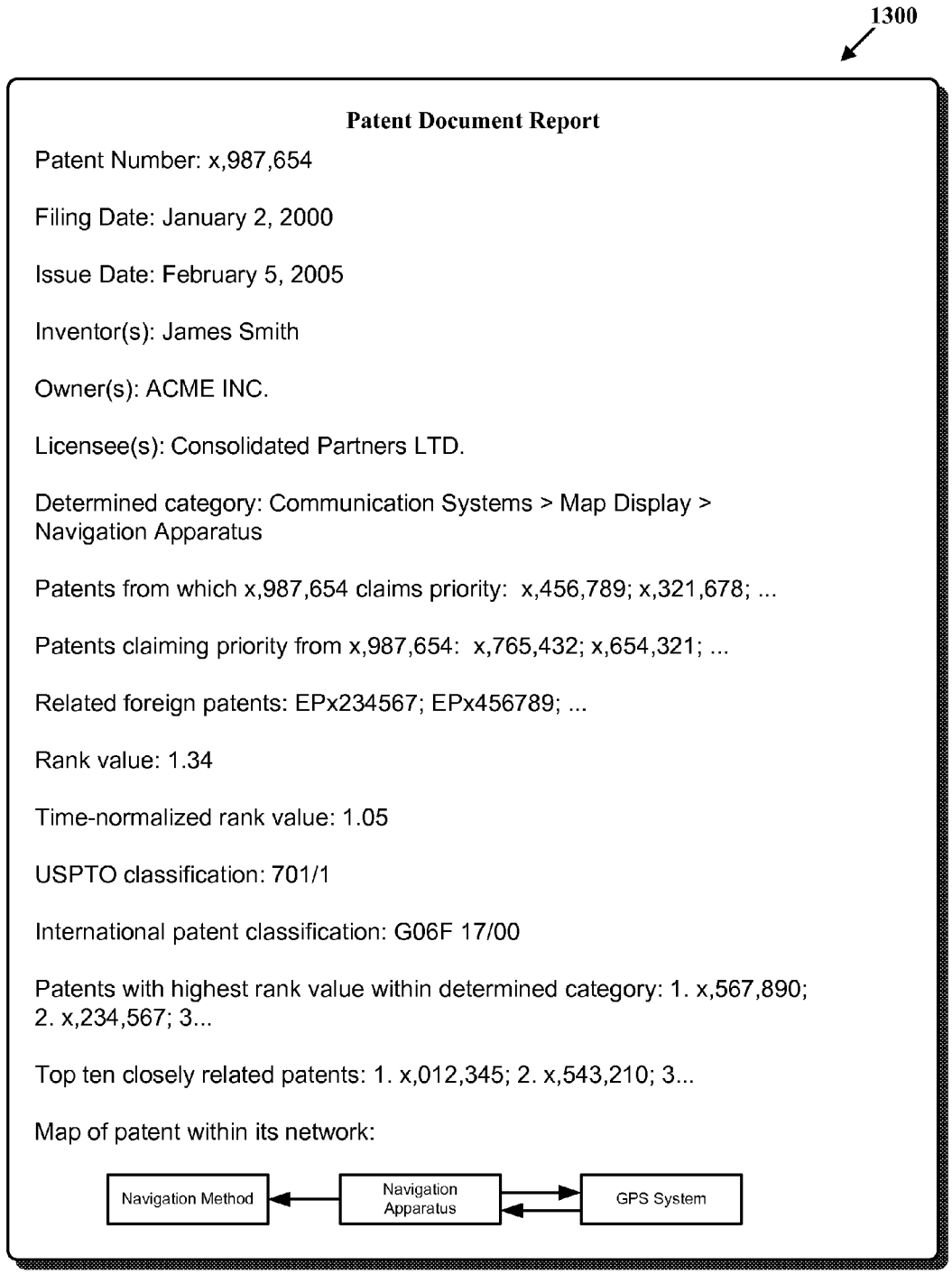
FIG. 13 is a conceptual illustration of an example patent report.

In one example, a document report that includes information about how a particular document is hierarchically classified, labeled, and/or ranked may be provided. For instance, if documents of a corpus of documents include patent documents, a patent document report may be provided. FIG. 13 is a conceptual illustration of an example report 1300. As shown in FIG. 13, the example report 1300 may include one or more of a patent number, filing date, issue date, inventor(s), owner/assignee, licensee(s). Additionally, the example report 1300 may list information about patents from which the patent document claims priority and/or patents claiming priority from the patent. Further, the example report 1300 may list a rank value, time-normalized rank value, hierarchically classified category, patent office classification. Also, the example report may list other highly ranked patent documents within the hierarchically classified category to which the patent document belongs. In addition, a document report may include metadata information associated with documents, such as any of the examples of metadata described herein or other types of metadata.

The example report 1300 is provided as an example, and is not meant to be limiting. Other reports including other types of information or configurations may also exist.

V. Example System

FIG. 14 is a simplified block diagram of an example computing device 1402. It should be understood that this and other arrangements described herein are set forth only as examples. Those skilled in the art will appreciate that other arrangements and elements (e.g., machines, interfaces, functions, orders, and groupings of functions, etc.) can be used instead and that some elements may be omitted altogether. Further, many of the elements described herein are functional entities that may be implemented as discrete or distributed components in conjunction with other components and in any suitable combination and location. Various functions described herein as being performed by one or more entities may be carried out by hardware, firmware, and/or software. For instance, various functions may be carried out by a processor executing instructions stored in memory.

The computing device 1402 may be configured to carry out the functions described herein. For example, the computing device 1402 may be configured to carry out any of the functions described with respect to the example methods of FIGS. 1 and 10 described above. As one example, the computing device 1402 may be configured to determine a hierarchical partition of a corpus of documents. As another example, the computing device 1402 may be configured to identify a change in network structure over time.

As shown, computing device 1402 may include, without limitation, a communication interface 1404, processor 1406, and data storage 1408, all of which may be communicatively linked together by a system bus, network, and/or other connection mechanism 1414.

Communication interface 1404 typically functions to communicatively couple computing device 1402 to other devices and/or entities. As such, communication interface 1404 may include a wired (e.g., Ethernet, without limitation) and/or wireless (e.g., CDMA and/or Wi-Fi, without limitation) communication interface, for communicating with other devices and/or entities. Communication interface 1404 may also include multiple interfaces, such as one through which computing device 1402 sends communication, and one through which computing device 1402 receives communication. Communication interface 1404 may be arranged to communicate according to one or more types of communication protocols mentioned herein and/or any others now known or later developed.

Processor 1406 may include one or more general-purpose processors (such as INTEL processors or the like) and/or one or more special-purpose processors (such as digital-signal processors or application-specific integrated circuits). To the extent processor 1406 includes more than one processor, such processors could work separately or in combination. Further, processor 1406 may be integrated in whole or in part with wireless-communication interface 1404 and/or with other components.

Data storage 1408, in turn, may include one or more volatile and/or non-volatile storage components, such as magnetic, optical, or organic memory components. As shown, data storage 1408 may include program data 1410 and program logic 1412 executable by processor 1406 to carry out various functions described herein. Although these components are described herein as separate data storage elements, the elements could just as well be physically integrated together or distributed in various other ways. For example, program data 1410 may be maintained in data storage 208 separate from program logic 1412, for easy updating and reference by program logic 1412.

Program data 1410 may include various data used by computing device 1402 in operation. As an example, program data 1410 may include information pertaining to biomedical image data and/or pharmacokinetic models. Similarly, program logic 1412 may include any additional program data, code, or instructions necessary to carry out the functions described herein. For example, program logic 1412 may include instructions executable by processor 1406 for causing computing device 1402 to carry out any of those functions described herein.

VI. Example Computer Readable Medium

Figure 15:
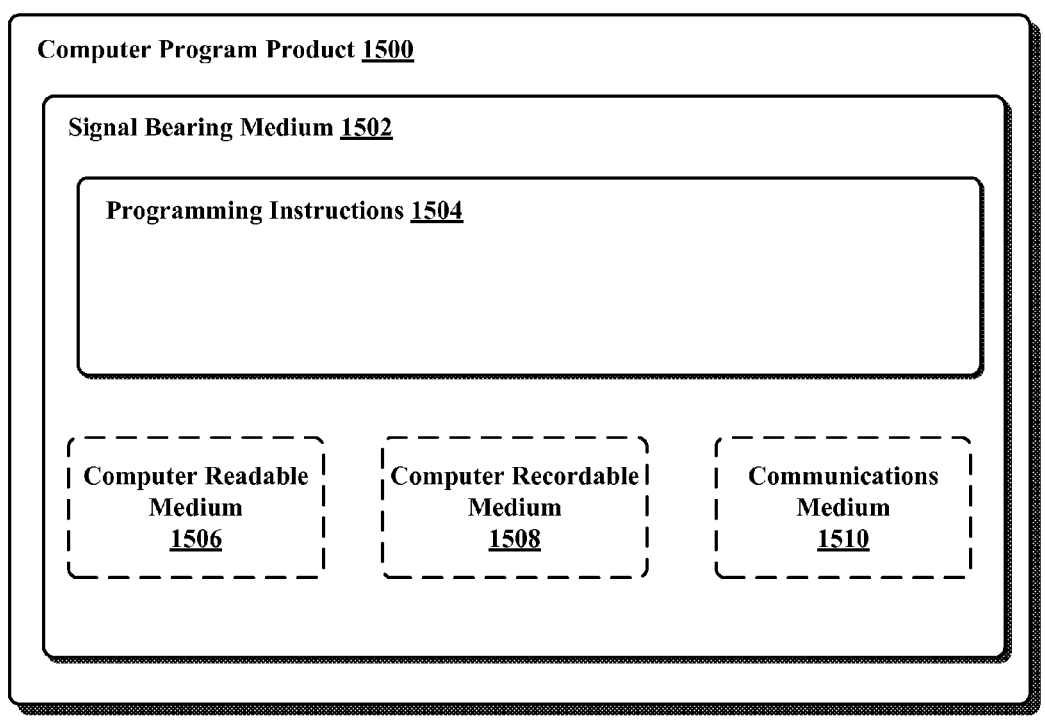
FIG. 15 is a schematic illustrating a conceptual partial view of an example computer program product that includes a computer program for executing a computer process on a computing device.

In some embodiments, the disclosed methods may be implemented by computer program logic, or instructions, encoded on a physical and/or non-transitory computer-readable storage media in a machine-readable format, or on other physical and/or non-transitory media or articles of manufacture. FIG. 15 is a schematic illustrating a conceptual partial view of an example computer program product that includes a computer program for executing a computer process on a computing device, arranged according to at least some embodiments presented herein.

In one embodiment, the example computer program product 1500 is provided using a signal bearing medium 1502. The signal bearing medium 1502 may include one or more programming instructions 1504 that, when executed by one or more processors may provide functionality or portions of the functionality described herein. In some examples, the signal bearing medium 1502 may encompass a computer-readable medium 1506, such as, but not limited to, a hard disk drive, a Compact Disc (CD), a Digital Video Disk (DVD), a digital tape, memory, etc. In some implementations, the signal bearing medium 1502 may encompass a computer recordable medium 1508, such as, but not limited to, memory, read/write (R/W) CDs, R/W DVDs, etc. In some implementations, the signal bearing medium 1502 may encompass a communications medium 1510, such as, but not limited to, a digital and/or an analog communication medium (e.g., a fiber optic cable, a waveguide, a wired communications link, a wireless communication link, etc.). Thus, for example, the signal bearing medium 1502 may be conveyed by a wireless form of the communications medium 1510. It should be understood, however, that computer-readable medium 1506, computer recordable medium 1508, and communications medium 1510 as contemplated herein are distinct mediums and that, in any event, computer-readable medium 1508 is a physical, non-transitory, computer-readable medium.

The one or more programming instructions 1504 may be, for example, computer executable and/or logic implemented instructions. In some examples, a computing device such as that shown in FIG. 14 may be configured to provide various operations, functions, or actions in response to the programming instructions 1504 conveyed to the computing device by one or more of the computer readable medium 1506, the computer recordable medium 1508, and/or the communications medium 1510.

The physical and/or non-transitory computer readable medium could also be distributed among multiple data storage elements, which could be remotely located from each other. The computing device that executes some or all of the stored instructions could be a computing device, such as the computing device illustrated in FIG. 14. Alternatively, the computing device that executes some or all of the stored instructions could be another computing device.

VII. Conclusion

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A computer-implemented method, comprising:
receiving document data indicating (i) a corpus of documents and (ii) references between documents within the corpus of documents;
determining a network comprising (i) two or more nodes, wherein each node corresponds to a respective document in the corpus of documents, and (ii) at least one directed edge, wherein each directed edge connects two respective nodes, and wherein each directed edge corresponds to a reference between two documents in the corpus of documents;
based on the directed edges of the network, determining a hierarchical partition of the documents, wherein the hierarchical partition defines a plurality of nested modules, and wherein each module in the plurality of nested modules is associated with one or more respective documents within the corpus of documents;
causing a graphical display to provide a visual indication of one or more of the plurality of nested modules;
determining a rank value associated with each respective document of the corpus based on the references between documents of the corpus of documents;
determining for each of one or more respective modules of the plurality of nested modules: (i) a sample group of one or more documents of the module based on one or more rank values associated with the one or more documents of the module and (ii) a label for the module based on mutual content within the one or more documents of the sample group; and
causing the graphical display to provide a visual indication of the label for each of the one or more respective modules of the plurality of nested modules.

2. The computer-implemented method of claim 1, wherein each reference between documents within the corpus of documents is time-directed, and wherein the determined network is in a form of an acyclic directed graph.

3. The computer-implemented method of claim 1, wherein the rank value associated with each respective document is determined based at least in part on a respective number of references to the respective document and the rank value associated with each of one or more documents referring to the respective document.

4. The computer-implemented method of claim 3, further comprising:
receiving document-selection data indicating a selection of a particular document; and
causing the graphical display to provide a visual indication of a respective rank value associated with the particular document.

5. The computer-implemented method of claim 3, further comprising:
receiving document-selection data indicating a selection of a group of documents;
determining a total rank value associated with the group of documents, wherein determining the total rank value comprises summing the rank value associated with each respective document of the group of documents; and
causing the graphical display to provide a visual indication of the total rank value associated with the group of documents.

6. The computer-implemented method of claim 3, further comprising:
receiving document-selection data indicating an identification of a particular category;
identifying one or more documents associated with the particular category;
determining an ordered list of the one or more identified documents based on the rank value associated with each of the one or more identified documents; and
causing the graphical display to provide a visual indication of the determined ordered list of the one or more identified documents.

7. The computer-implemented method of claim 3, further comprising:
receiving document-selection data indicating a selection of a particular module of the plurality of nested modules;
determining an ordered list of one or more documents within the module based on the rank value associated with each of the one or more documents within the module; and
causing a graphical display to provide a visual indication of the determined ordered list of one or more documents within the module.

8. The computer-implemented method of claim 3, further comprising determining a monetary value associated with each of one or more respective documents of the corpus of documents based on the rank value associated with the document.

9. The computer-implemented method of claim 1, further comprising:
receiving document-selection data indicating a selection of a particular document; and
causing the graphical display to provide a visual indication of a module comprising the particular document.

10. The computer-implemented method of claim 1, further comprising:
receiving document-selection data indicating a selection of a particular module of the plurality of nested modules; and
causing the graphical display to provide a visual indication of one or more submodules associated with the particular module.

11. The computer-implemented method of claim 10, wherein a respective size of each of the one or more submodules is proportional to a total respective rank value of documents within the submodule.

12. The computer-implemented method of claim 1, wherein a respective size of each of the one or more modules in the visual indication of the one or more of the plurality of nested modules is proportional to a total respective rank value of documents within the module.

13. The computer-implemented method of claim 1, wherein determining a hierarchical partition of the documents comprises determining a hierarchical partition that minimizes a hierarchical map equation, wherein the hierarchical map equation quantifies an average description length associated with modeling a process of flow on the network.

14. The computer-implemented method of claim 1, wherein the received document data comprises document data associated with a first time period, and wherein the method further comprises:
receiving partition data indicating a hierarchical partition of another corpus of documents associated with a second time period, wherein the hierarchical partition defines another plurality of nested modules, and wherein each module in the another plurality of nested modules is associated with one or more respective documents within the another corpus of documents;
comparing (i) a difference between (a) a number of references to documents within a particular module associated with the first time period and (b) a number of references to documents within a corresponding module associated with the second time period to (ii) a threshold; and based on the comparison, causing the graphical display to provide a visual indication of the difference and the particular module.

15. The computer-implemented method of claim 1, wherein documents of the corpus of documents comprise one or more of patent documents, scholarly documents, litigation documents, government documents, social media documents, online documents, magazine articles, and books.

16. The computer-implemented method of claim 1, wherein documents of the corpus of documents comprise patent documents, and the method further comprising:

associating metadata with one or more corresponding patent documents, wherein the metadata comprises an objective measurement of monetary value; and determining an objective measurement of monetary value corresponding to a given patent document based on the metadata associated with the one or more corresponding patent documents and the rank value associated with the one or more patent documents.

17. The computer-implemented method of claim 1, wherein documents of the corpus of documents comprise patent documents, and the method further comprising:

associating metadata with one or more corresponding patent documents, wherein the metadata comprises an objective indication of patent validity; and determining an objective indication of patent invalidity corresponding to a given patent document based on the metadata associated with the one or more corresponding patent documents and the rank value associated with the one or more corresponding patent documents.

18. The computer-implemented method of claim 1, wherein documents of the corpus of documents comprise patent documents, and wherein each module of the plurality of nested modules comprises an objective classification of a technology area.

19. The computer-implemented method of claim 1, wherein documents of the corpus of documents comprise patent documents, and the method further comprising:

determining, for each of one or more particular modules of the plurality of nested modules, a total-connection-number, wherein the total-connection-number comprises one or more of (a) a number of references from patent documents associated with the module to other patent documents not associated with the module and (b) a number of references to patent documents associated with the module from other patent documents not associated with the module; and identifying an unconnected module of the one or more particular modules, wherein the unconnected module comprises a module having a total-connection-number that is below a total-connection-number threshold.

20. The computer-implemented method of claim 1, wherein documents of the corpus of documents comprise patent documents, and the method further comprising:

receiving document-selection data indicating a selection of a particular patent document; and identifying one or more documents within a module of the particular patent document having dates prior to a date associated with the particular patent document.

21. A system comprising:
at least one processor;
a physical computer readable medium; and
program instructions stored on the physical computer readable medium and executable by the at least one processor to:

receive document data indicating (i) a corpus of documents and (ii) references between documents within the corpus of documents;

determine a network comprising (i) two or more nodes, wherein each node corresponds to a respective document in the corpus of documents, and (ii) at least one directed edge, wherein each directed edge connects two respective nodes, and wherein each directed edge corresponds to a reference between two documents in the corpus of documents;

based on the directed edges of the network, determine a hierarchical partition of the documents, wherein the hierarchical partition defines a plurality of nested modules, and wherein each module in the plurality of nested modules is associated with one or more respective documents within the corpus of documents;

determine a rank value associated with each respective document of the corpus based on the references between documents of the corpus of document; and determine for each of one or more respective modules of the plurality of nested modules: (i) a sample group of one or more documents of the module based on one or more rank values associated with the one or more documents of the module and (ii) a label for the module based on mutual content within the one or more documents of the sample group.

22. The system of claim 21, wherein the rank value associated with each respective document is determined based at least in part on a respective number of references to the respective document and the rank value associated with each of one or more documents referring to the respective document.

23. A physical computer readable medium having instructions stored thereon, the instructions comprising:

instructions for receiving document data indicating (i) a corpus of documents and (ii) references between documents within the corpus of documents;

instructions for determining a network comprising (i) two or more nodes, wherein each node corresponds to a respective document in the corpus of documents, and (ii) at least one directed edge, wherein each directed edge connects two respective nodes, and wherein each directed edge corresponds to a reference between two documents in the corpus of documents;

instructions for determining a hierarchical partition of the documents based on the directed edges of the network, wherein the hierarchical partition defines a plurality of nested modules, and wherein each module in the plurality of nested modules is associated with one or more respective documents within the corpus of documents;

instructions for causing a graphical display to provide a visual indication of one or more of the plurality of nested modules;

instructions for determining a rank value associated with each respective document of the corpus based on the references between documents of the corpus of document; and instructions for determining for each of one or more respective modules of the plurality of nested modules: (i) a sample group of one or more documents of the module based on one or more rank values associated with the one or more documents of the module and (ii)

a label for the module based on mutual content within the one or more documents of the sample group; and instructions for causing the graphical display to provide a visual indication of the label for each of the one or more respective modules of the plurality of nested modules.

24. A computer-implemented method, comprising:

receiving document data indicating (i) a corpus of documents and (ii) references between documents within the corpus of documents, wherein documents of the corpus of documents comprise patent documents;

determining a network comprising (i) two or more nodes, wherein each node corresponds to a respective document in the corpus of documents, and (ii) at least one directed edge, wherein each directed edge connects two respective nodes, and wherein each directed edge corresponds to a reference between two documents in the corpus of documents;

based on the directed edges of the network, determining a hierarchical partition of the documents, wherein the hierarchical partition defines a plurality of nested modules, and wherein each module in the plurality of nested modules is associated with one or more respective documents within the corpus of documents;

determining a rank value associated with each respective document of the corpus based on the references between documents of the corpus of documents;

causing a graphical display to provide a visual indication of one or more of the plurality of nested modules;

associating metadata with one or more corresponding patent documents, wherein the metadata comprises an objective measure of monetary value; and determining an objective measurement of monetary value corresponding to a given patent document based on the metadata associated with the one or more corresponding patent documents and one or more rank values associated with the one or more patent documents.

25. The computer-implemented method of claim 24, wherein the rank value associated with each respective document is determined based at least in part on a respective number of references to the respective document and the rank value associated with each of one or more documents referring to the respective document.

26. The computer-implemented method of claim 24, further comprising:

receiving document-selection data indicating a selection of a particular document; and causing the graphical display to provide a visual indication of a module comprising the particular document.

27. A computer-implemented method, comprising:

receiving document data indicating (i) a corpus of documents and (ii) references between documents within the corpus of documents, wherein documents of the corpus of documents comprise patent documents;

determining a network comprising (i) two or more nodes, wherein each node corresponds to a respective document in the corpus of documents, and (ii) at least one directed edge, wherein each directed edge connects two respective nodes, and wherein each directed edge corresponds to a reference between two documents in the corpus of documents;

based on the directed edges of the network, determining a hierarchical partition of the documents, wherein the hierarchical partition defines a plurality of nested modules, and wherein each module in the plurality of nested modules is associated with one or more respective documents within the corpus of documents;

determining a rank value associated with each respective document of the corpus based on the references between documents of the corpus of documents;

causing a graphical display to provide a visual indication of one or more of the plurality of nested modules;

associating metadata with one or more corresponding patent documents, wherein the metadata comprises an objective indication of patent validity; and determining an objective measurement of patent validity corresponding to a given patent document based on the metadata associated with the one or more corresponding patent documents and one or more rank values associated with the one or more patent documents.

28. The computer-implemented method of claim 27, wherein the rank value associated with each respective document is determined based at least in part on a respective number of references to the respective document and the rank value associated with each of one or more documents referring to the respective document.

29. The computer-implemented method of claim 27, further comprising:

receiving document-selection data indicating a selection of a particular document; and causing the graphical display to provide a visual indication of a module comprising the particular document.

30. A computer-implemented method, comprising:

receiving document data indicating (i) a corpus of documents and (ii) references between documents within the corpus of documents, wherein documents of the corpus of documents comprise patent documents;

determining a network comprising (i) two or more nodes, wherein each node corresponds to a respective document in the corpus of documents, and (ii) at least one directed edge, wherein each directed edge connects two respective nodes, and wherein each directed edge corresponds to a reference between two documents in the corpus of documents;

based on the directed edges of the network, determining a hierarchical partition of the documents, wherein the hierarchical partition defines a plurality of nested modules, and wherein each module in the plurality of nested modules is associated with one or more respective documents within the corpus of documents;

causing a graphical display to provide a visual indication of one or more of the plurality of nested modules;

determining, for each of one or more particular modules of the plurality of nested modules, a total-connection-number, wherein the total-connection-number comprises one or more of (a) a number of references from patent documents associated with the module to other patent documents not associated with the module and (b) a number of references to patent documents associated with the module from other patent documents not associated with the module; and identifying an unconnected module of the one or more particular modules, wherein the unconnected module comprises a module having a total-connection-number that is below a total-connection-number threshold.

31. The computer-implemented method of claim 30, further comprising:

receiving document-selection data indicating a selection of a particular document; and causing the graphical display to provide a visual indication of a module comprising the particular document.

32. The computer-implemented method of claim 30, further comprising:

receiving document-selection data indicating a selection of a particular module of the plurality of nested modules; and causing the graphical display to provide a visual indication of one or more submodules associated with the particular module.

\* \* \* \* \*